(12) United States Patent
Glover et al.

(10) Patent No.: US 11,000,785 B2
(45) Date of Patent: May 11, 2021

(54) STRUCTURED ELEMENTS AND METHODS OF USE

(71) Applicant: CRYSTAPHASE PRODUCTS, INC., Houston, TX (US)

(72) Inventors: John Glover, Houston, TX (US); Austin Schneider, Humble, TX (US); Peter Ham, Houston, TX (US)

(73) Assignee: CRYSTAPHASE PRODUCTS, INC., Houston, TX (US)

( * ) Notice: Subject to any disclaimer, the term of this patent is extended or adjusted under 35 U.S.C. 154(b) by 0 days.

(21) Appl. No.: 16/995,760

(22) Filed: Aug. 17, 2020

(65) Prior Publication Data
US 2020/0376414 A1    Dec. 3, 2020

Related U.S. Application Data

(62) Division of application No. 15/393,573, filed on Dec. 29, 2016, now Pat. No. 10,744,426.
(Continued)

(51) Int. Cl.
*B01D 21/00* (2006.01)
*B01D 3/00* (2006.01)
*B01J 19/30* (2006.01)

(52) U.S. Cl.
CPC ......... *B01D 21/0087* (2013.01); *B01D 3/008* (2013.01); *B01D 21/0012* (2013.01); *B01J 19/30* (2013.01); *B01J 2219/30* (2013.01); *B01J 2219/30207* (2013.01); *B01J 2219/30238* (2013.01); *B01J 2219/30246* (2013.01);
(Continued)

(58) Field of Classification Search
None
See application file for complete search history.

(56) References Cited

U.S. PATENT DOCUMENTS

| 436,414 A | 9/1890 | Graham |
| 578,548 A | 3/1897 | Deruelle |

(Continued)

FOREIGN PATENT DOCUMENTS

| AU | 2004232690 | 11/2004 |
| AU | 2010203014 | 8/2010 |

(Continued)

OTHER PUBLICATIONS

Schildhauer; Application of Film-Flow-Monoliths . . . , Technical Univesity Delft; Julianalaan 136, NL-2628 BL Delft; The Netherlands; 1 page; Oct. 29, 2003.
(Continued)

*Primary Examiner* — Robert J Popovics
(74) *Attorney, Agent, or Firm* — Greenberg Traurig LLP

(57) ABSTRACT

Structured elements with capabilities for stream flow division and distribution and mitigation of undesired species that exceed those of conventionally available materials are provided. The structured elements provide increased opportunities for surface attraction, retention and coalescence of undesired species in a process stream. The functional contact surfaces of the structured elements can include one or more of the faces of cells, the surfaces of struts connecting cells, the surfaces of nodes connecting struts, and the surfaces of asperities or irregularities caused by channels, flutes, spikes, fibrils or filaments in or on the material surfaces.

4 Claims, 7 Drawing Sheets

Related U.S. Application Data

(60) Provisional application No. 62/294,718, filed on Feb. 12, 2016, provisional application No. 62/273,590, filed on Dec. 31, 2015.

(52) U.S. Cl.
CPC ............. *B01J 2219/30269* (2013.01); *B01J 2219/30416* (2013.01); *B01J 2219/30475* (2013.01); *B01J 2219/30483* (2013.01); *B01J 2219/30491* (2013.01)

(56) References Cited

U.S. PATENT DOCUMENTS

| | | | |
|---|---|---|---|
| 598,351 A | 2/1898 | Staub | |
| 1,947,777 A | 2/1934 | Huff et al. | |
| 2,000,078 A | 5/1935 | Haseltine | |
| 2,006,078 A | 6/1935 | Pyzel | |
| 2,055,162 A | 9/1936 | Friedrich | |
| 2,153,599 A | 4/1939 | Thomas | |
| 2,183,657 A | 12/1939 | Page | |
| 2,198,861 A * | 4/1940 | Chamberlain | B01J 19/30 261/95 |
| 2,212,932 A * | 8/1940 | Miller | B01J 19/30 261/94 |
| 2,375,336 A * | 5/1945 | Weitkamp | B01J 19/30 261/95 |
| 2,408,164 A | 9/1946 | Foster | |
| 2,439,021 A | 4/1948 | Quigg | |
| 2,546,479 A * | 3/1951 | Sodano | B01J 19/30 261/101 |
| 2,571,958 A | 10/1951 | Slaughter et al. | |
| 2,739,118 A | 3/1956 | Comte | |
| 2,793,017 A | 5/1957 | Lake | |
| 2,819,887 A | 1/1958 | Eversole et al. | |
| 2,867,425 A * | 1/1959 | Teller | B01J 19/30 261/95 |
| 2,893,852 A | 7/1959 | Montgomery | |
| 2,919,981 A | 1/1960 | Calva | |
| 2,985,589 A | 5/1961 | Broughton et al. | |
| 3,090,094 A | 5/1963 | Schwartzwalder et al. | |
| 3,100,688 A | 8/1963 | Dess | |
| 3,151,187 A | 9/1964 | Comte | |
| 3,167,600 A | 1/1965 | Worman | |
| 3,169,839 A | 2/1965 | Calva | |
| 3,171,820 A | 3/1965 | Volz | |
| 3,175,918 A | 3/1965 | McGahan | |
| 3,208,833 A * | 9/1965 | Carson | B01J 8/0278 422/607 |
| 3,214,247 A | 10/1965 | Broughton | |
| 3,219,194 A * | 11/1965 | Schwartzwalder | B01D 24/08 210/508 |
| 3,232,589 A | 2/1966 | Eckert | |
| 3,266,787 A * | 8/1966 | Eckert | B21D 53/16 261/94 |
| 3,329,271 A * | 7/1967 | Ward | C02F 3/101 210/150 |
| 3,361,839 A | 1/1968 | Lester | |
| 3,410,057 A | 11/1968 | Lerner | |
| 3,423,185 A | 1/1969 | Ballard et al. | |
| 3,431,082 A | 3/1969 | Sellin | |
| 3,487,112 A | 12/1969 | Paulik et al. | |
| 3,489,529 A | 1/1970 | Dudych et al. | |
| 3,498,755 A | 3/1970 | Borre | |
| 3,506,248 A * | 4/1970 | Starbuck | B01J 19/32 261/94 |
| 3,543,937 A * | 12/1970 | Choun | C02F 3/10 210/150 |
| 3,544,457 A | 12/1970 | Fredrick et al. | |
| 3,562,800 A | 2/1971 | Carlson | |
| 3,563,887 A | 2/1971 | Sommers et al. | |
| 3,618,910 A * | 11/1971 | Arndt | B01J 19/30 261/94 |
| 3,635,943 A | 1/1972 | Stewart | |
| 3,657,864 A | 4/1972 | Davis, Jr. et al. | |
| 3,685,971 A | 8/1972 | Carson | |
| 3,706,812 A | 12/1972 | Derosset et al. | |
| 3,717,670 A | 2/1973 | Schultz | |
| 3,732,078 A | 5/1973 | Kassarjian | |
| 3,752,453 A * | 8/1973 | Doyne | B01J 19/30 261/94 |
| 3,758,087 A * | 9/1973 | Hoon, Jr. | B01J 19/30 261/94 |
| 3,787,188 A | 1/1974 | Lyon | |
| 3,787,189 A | 1/1974 | Lovell et al. | |
| 3,789,989 A | 2/1974 | Carson | |
| 3,796,657 A | 3/1974 | Protorius et al. | |
| D232,236 S * | 7/1974 | La Borde | D23/209 |
| 3,823,924 A * | 7/1974 | Hoon, Jr. | B01J 19/30 261/94 |
| 3,844,936 A | 10/1974 | Newson | |
| 3,888,633 A | 6/1975 | Grosboll et al. | |
| 3,892,583 A | 7/1975 | Winter et al. | |
| 3,898,180 A | 8/1975 | Crooks et al. | |
| 3,914,351 A * | 10/1975 | McKeown | B01J 19/30 261/98 |
| 3,924,807 A * | 12/1975 | Morgan | F24F 6/04 239/55 |
| 3,947,347 A | 3/1976 | Mitchell | |
| 3,960,508 A | 6/1976 | Bessant et al. | |
| 3,962,078 A | 6/1976 | Hirs | |
| 3,992,282 A | 11/1976 | Grosboll et al. | |
| D243,531 S * | 3/1977 | Strigle, Jr. | D23/209 |
| 4,029,482 A | 6/1977 | Postma et al. | |
| RE29,314 E | 7/1977 | Carlson et al. | |
| RE29,315 E | 7/1977 | Carlson et al. | |
| 4,033,727 A | 7/1977 | Vautrain | |
| 4,041,113 A * | 8/1977 | McKeown | B01D 47/14 261/98 |
| 4,072,736 A * | 2/1978 | Fattinger | B01J 19/30 261/97 |
| 4,086,307 A | 4/1978 | Glaspie | |
| 4,113,810 A * | 9/1978 | Ikawa | B01J 19/30 202/158 |
| 4,149,862 A | 4/1979 | Sewell, Sr. | |
| 4,188,197 A | 2/1980 | Amberkar et al. | |
| 4,197,205 A | 4/1980 | Hirs | |
| 4,200,532 A * | 4/1980 | Iwatani | B01J 19/30 210/151 |
| 4,203,935 A | 5/1980 | Hackenjos | |
| 4,251,239 A | 2/1981 | Clyde et al. | |
| 4,275,019 A * | 6/1981 | Bednarski | B01J 19/30 261/98 |
| 4,285,910 A | 8/1981 | Kennedy, Jr. | |
| 4,329,318 A | 5/1982 | Le Grouyellec et al. | |
| 4,342,643 A | 8/1982 | Kyan | |
| 4,374,020 A | 2/1983 | Trevino et al. | |
| 4,378,292 A | 3/1983 | Haase | |
| 4,380,529 A | 4/1983 | Gupta | |
| 4,402,832 A | 9/1983 | Gerhold | |
| 4,425,285 A * | 1/1984 | Shimoi | B01J 19/30 202/158 |
| 4,443,559 A | 4/1984 | Smith, Jr. | |
| 4,457,849 A * | 7/1984 | Heinze | B01D 24/165 210/807 |
| 4,478,721 A | 10/1984 | Gerhold | |
| 4,483,771 A | 11/1984 | Koch | |
| 4,487,727 A | 12/1984 | Ballato, Jr. | |
| 4,504,396 A | 3/1985 | Vardi et al. | |
| 4,511,519 A | 4/1985 | Hsia | |
| 4,519,960 A * | 5/1985 | Kitterman | B01J 19/30 202/158 |
| 4,522,767 A * | 6/1985 | Billet | B01J 19/30 261/94 |
| 4,537,731 A * | 8/1985 | Billet | B01J 19/30 261/94 |
| 4,554,114 A * | 11/1985 | Glen | B01J 19/30 261/95 |
| 4,568,595 A | 2/1986 | Morris | |
| 4,569,821 A | 2/1986 | Duperray et al. | |
| 4,579,647 A | 4/1986 | Smith | |

(56) References Cited

U.S. PATENT DOCUMENTS

| | | | |
|---|---|---|---|
| 4,581,299 A * | 4/1986 | Jager | B01J 19/30 261/DIG. 72 |
| 4,615,796 A | 10/1986 | Kramer | |
| 4,642,089 A | 2/1987 | Zupkas et al. | |
| 4,642,397 A | 2/1987 | Zinnen et al. | |
| 4,668,442 A | 5/1987 | Lang | |
| 4,669,890 A | 6/1987 | Peyrot | |
| 4,681,674 A | 7/1987 | Graven et al. | |
| 4,691,031 A | 9/1987 | Suciu et al. | |
| 4,708,852 A | 11/1987 | Helbling, Jr. et al. | |
| 4,711,930 A | 12/1987 | Hoelderick et al. | |
| 4,716,066 A * | 12/1987 | Wymann | B01J 19/30 261/94 |
| 4,719,090 A | 1/1988 | Masaki | |
| 4,724,593 A * | 2/1988 | Lang | B01J 19/30 29/896.6 |
| 4,726,825 A | 2/1988 | Natale | |
| 4,731,205 A * | 3/1988 | McNulty | B01J 19/30 261/94 |
| 4,775,460 A | 10/1988 | Reno | |
| 4,788,040 A | 11/1988 | Campagnolo et al. | |
| 4,798,676 A | 1/1989 | Matkovich | |
| 4,810,685 A | 3/1989 | Twigg et al. | |
| 4,830,736 A | 5/1989 | Hung et al. | |
| 4,842,920 A * | 6/1989 | Banai | B01J 19/30 428/184 |
| 4,849,569 A | 7/1989 | Smith, Jr. | |
| 4,859,642 A | 8/1989 | Hoelderick et al. | |
| 4,863,606 A * | 9/1989 | Ryall | C02F 3/301 210/605 |
| 4,863,712 A | 9/1989 | Twigg et al. | |
| 4,880,541 A | 11/1989 | Chiron et al. | |
| 4,938,422 A | 7/1990 | Koves | |
| 4,950,834 A | 8/1990 | Arganbright et al. | |
| 4,954,251 A | 9/1990 | Barnes et al. | |
| 4,968,651 A | 11/1990 | Crabtree | |
| 4,971,771 A | 11/1990 | Stahl | |
| 4,982,022 A | 1/1991 | Smith, Jr. | |
| 4,985,211 A | 1/1991 | Akihama et al. | |
| 5,013,426 A | 5/1991 | Dang Vu et al. | |
| 5,017,542 A | 5/1991 | Matan et al. | |
| 5,043,506 A | 8/1991 | Crossland | |
| 5,055,627 A | 10/1991 | Smith, Jr. et al. | |
| 5,104,546 A | 4/1992 | Filson et al. | |
| 5,113,015 A | 5/1992 | Palmer et al. | |
| 5,118,873 A | 6/1992 | Smith, Jr. | |
| 5,122,276 A | 6/1992 | Loikits | |
| 5,143,700 A | 9/1992 | Anguil | |
| D331,793 S * | 12/1992 | Erwes | D23/209 |
| 5,177,961 A | 1/1993 | Whittenberger | |
| 5,188,772 A * | 2/1993 | Yu | B01D 3/16 261/94 |
| 5,189,001 A | 2/1993 | Johnson | |
| D334,970 S * | 4/1993 | Tominaga | D23/209 |
| D334,971 S * | 4/1993 | Tominaga | D23/209 |
| 5,202,027 A * | 4/1993 | Stuth | C02F 3/087 210/615 |
| 5,202,097 A | 4/1993 | Poussin | |
| 5,217,603 A | 6/1993 | Inoue et al. | |
| 5,217,616 A * | 6/1993 | Sanyal | C02F 3/10 210/617 |
| 5,229,015 A * | 7/1993 | Keep | B01D 17/0208 210/799 |
| 5,235,102 A | 8/1993 | Palmer et al. | |
| 5,243,115 A | 9/1993 | Smith, Jr. et al. | |
| 5,248,415 A * | 9/1993 | Masuda | B01D 24/002 210/154 |
| 5,248,836 A | 9/1993 | Bakshi et al. | |
| D345,410 S * | 3/1994 | Del Prete | D15/144.1 |
| 5,298,226 A | 3/1994 | Nowobilski | |
| 5,304,423 A | 4/1994 | Niknafs et al. | |
| 5,326,512 A | 7/1994 | Stillwagon et al. | |
| 5,336,656 A | 8/1994 | Campbell | |
| 5,368,722 A | 11/1994 | Bartholdy | |
| 5,384,300 A | 1/1995 | Feeley et al. | |
| 5,384,302 A | 1/1995 | Gerdes et al. | |
| 5,399,535 A | 3/1995 | Whitman | |
| 5,401,398 A * | 3/1995 | McManus | B01J 19/30 210/150 |
| 5,409,375 A | 4/1995 | Butcher | |
| 5,411,681 A * | 5/1995 | Seah | B01J 19/30 261/94 |
| 5,446,223 A | 8/1995 | Smith, Jr. | |
| 5,454,947 A | 10/1995 | Olapinski et al. | |
| 5,476,978 A | 12/1995 | Smith, Jr. et al. | |
| 5,510,056 A | 4/1996 | Jacobs et al. | |
| 5,512,530 A | 4/1996 | Gerdes et al. | |
| 5,523,503 A | 6/1996 | Funk et al. | |
| 5,538,544 A | 7/1996 | Nowobilski et al. | |
| 5,543,088 A * | 8/1996 | Halbirt | B01J 19/30 261/94 |
| 5,558,029 A | 9/1996 | Peake | |
| 5,599,363 A | 2/1997 | Percy | |
| 5,624,547 A | 4/1997 | Sudhakar et al. | |
| D381,394 S | 7/1997 | Lex, Jr. et al. | |
| 5,660,715 A | 8/1997 | Trimble et al. | |
| 5,670,095 A | 9/1997 | Southam | |
| 5,690,819 A * | 11/1997 | Chianh | A01K 63/045 210/150 |
| 5,707,513 A * | 1/1998 | Jowett | C02F 3/288 210/150 |
| 5,766,290 A | 6/1998 | Zievers et al. | |
| 5,767,470 A | 6/1998 | Cha | |
| 5,779,886 A * | 7/1998 | Couture | B01J 19/30 210/150 |
| 5,779,993 A | 7/1998 | Gentry | |
| 5,785,851 A | 7/1998 | Morris et al. | |
| 5,799,596 A | 9/1998 | Peake | |
| 5,817,594 A | 10/1998 | McNamara et al. | |
| 5,853,579 A | 12/1998 | Rummier et al. | |
| 5,853,582 A | 12/1998 | Grangeon et al. | |
| 5,866,736 A | 2/1999 | Chen | |
| 5,873,998 A | 2/1999 | Grangeon et al. | |
| 5,895,572 A | 4/1999 | Joulin et al. | |
| 5,901,575 A | 5/1999 | Sunder | |
| 5,910,241 A | 6/1999 | McNamara et al. | |
| 5,943,969 A | 8/1999 | Peake | |
| 5,972,214 A | 10/1999 | Callebert et al. | |
| 5,980,739 A * | 11/1999 | Jowett | C02F 3/10 210/151 |
| 6,019,810 A * | 2/2000 | Phillips | B01D 53/84 55/512 |
| 6,024,871 A | 2/2000 | Harter et al. | |
| 6,033,629 A | 3/2000 | Friederick et al. | |
| 6,036,743 A | 3/2000 | Butcher et al. | |
| 6,096,278 A | 8/2000 | Gary | |
| 6,110,389 A * | 8/2000 | Horowitz | B01D 24/165 210/794 |
| 6,117,812 A | 9/2000 | Gao et al. | |
| 6,153,094 A * | 11/2000 | Jowett | C02F 3/10 210/151 |
| 6,156,197 A | 12/2000 | Dessapt et al. | |
| 6,242,661 B1 | 6/2001 | Podrebarac et al. | |
| 6,258,900 B1 | 7/2001 | Glover et al. | |
| 6,262,131 B1 | 7/2001 | Arcuri et al. | |
| 6,284,022 B1 | 9/2001 | Sachweh et al. | |
| 6,291,603 B1 | 9/2001 | Glover et al. | |
| 6,315,972 B1 | 11/2001 | Mehdizadeh et al. | |
| 6,352,579 B1 | 3/2002 | Hirata et al. | |
| 6,371,452 B1 * | 4/2002 | Shojaie | B01J 19/30 261/94 |
| 6,379,032 B1 * | 4/2002 | Sorensen | B01F 13/002 366/130 |
| 6,387,534 B1 * | 5/2002 | Niknafs | B01J 19/30 261/95 |
| 6,402,959 B1 | 6/2002 | Dessapt et al. | |
| 6,454,948 B2 | 9/2002 | Ferschneider et al. | |
| D465,257 S * | 11/2002 | Van Olst | C02F 3/10 D23/207 |
| 6,521,562 B1 | 2/2003 | Clem et al. | |
| 6,524,849 B1 * | 2/2003 | Adams | B01D 53/85 435/299.1 |

(56) References Cited

U.S. PATENT DOCUMENTS

| | | | |
|---|---|---|---|
| 6,583,329 B1 | 6/2003 | Podrebarac | |
| 6,630,078 B2 | 10/2003 | Kourtakis et al. | |
| 6,631,890 B1* | 10/2003 | Lau | B01J 19/30 261/94 |
| 6,713,772 B2 | 3/2004 | Goodman et al. | |
| 6,797,175 B2 | 9/2004 | Hotier | |
| 6,811,147 B2* | 11/2004 | Lau | B01J 19/30 261/95 |
| 6,835,224 B2 | 12/2004 | Cheng | |
| 6,852,227 B1* | 2/2005 | Petrone | B01J 19/30 210/616 |
| 6,890,878 B2 | 5/2005 | Moore | |
| 7,014,175 B2 | 3/2006 | Honnell | |
| 7,125,490 B2 | 10/2006 | Clendenning et al. | |
| 7,255,917 B2 | 8/2007 | Rochlin et al. | |
| 7,265,189 B2 | 9/2007 | Glover | |
| 7,303,668 B2* | 12/2007 | Liao | C02F 3/2806 210/150 |
| 7,314,551 B2 | 1/2008 | Frey et al. | |
| 7,390,403 B2 | 6/2008 | Siwak | |
| 7,393,510 B2 | 7/2008 | Glover | |
| 7,427,385 B2 | 9/2008 | Scheirer et al. | |
| 7,488,413 B2* | 2/2009 | Badreddine | C02F 3/087 210/151 |
| 7,527,671 B1 | 5/2009 | Stuecker et al. | |
| 7,544,288 B1* | 6/2009 | Cook | E04D 13/0767 210/150 |
| 7,637,485 B2* | 12/2009 | Honnell | B01J 19/30 261/95 |
| 7,722,832 B2 | 5/2010 | Glover et al. | |
| 7,741,502 B2 | 6/2010 | Lecocq et al. | |
| 7,748,688 B2* | 7/2010 | Bessettes | B01J 19/32 261/94 |
| 8,062,521 B2 | 11/2011 | Glover | |
| 8,241,717 B1* | 8/2012 | Anderson | C02F 3/106 428/35.6 |
| 8,282,890 B2 | 10/2012 | Niknafa et al. | |
| 8,293,195 B2 | 10/2012 | Blanchard | |
| 8,313,709 B2 | 11/2012 | Glover | |
| D672,009 S * | 12/2012 | Flournoy | D23/207 |
| 8,500,852 B2 | 8/2013 | Galbraith | |
| 8,524,076 B2* | 9/2013 | Yang | A63H 33/086 210/150 |
| 8,524,164 B2 | 9/2013 | Glover | |
| 8,550,157 B2 | 10/2013 | O'Malley | |
| 8,663,474 B2 | 3/2014 | Niazi | |
| D705,499 S * | 5/2014 | Zamarripa | D30/124 |
| 9,056,268 B2 | 6/2015 | Jones et al. | |
| 9,101,863 B2 | 8/2015 | Glover | |
| 9,205,392 B2 | 12/2015 | Byl et al. | |
| 9,352,292 B2 | 5/2016 | Solantie et al. | |
| D780,286 S * | 2/2017 | Ausner | D23/207 |
| 9,732,774 B1 | 8/2017 | Glover | |
| 10,054,140 B2 | 8/2018 | Glover et al. | |
| 10,161,428 B2 | 12/2018 | Glover et al. | |
| 10,421,067 B2 | 9/2019 | Glover | |
| 10,421,068 B2 | 9/2019 | Glover | |
| 10,449,531 B2 | 10/2019 | Glover | |
| 10,500,581 B1 | 12/2019 | Glover | |
| 10,525,456 B2 | 1/2020 | Glover | |
| 10,543,483 B2 | 1/2020 | Glover | |
| 10,557,486 B2 | 2/2020 | Glover et al. | |
| 10,655,654 B2 | 5/2020 | Glover et al. | |
| 10,662,986 B2 | 5/2020 | Glover | |
| 10,744,426 B2* | 8/2020 | Glover | B01J 19/30 |
| 10,864,465 B2* | 12/2020 | Boyd | B01D 24/4621 |
| 10,920,807 B2 | 2/2021 | Glover et al. | |
| 2001/0015336 A1 | 8/2001 | Glover | |
| 2001/0042928 A1* | 11/2001 | Nagaoka | B01J 19/32 261/94 |
| 2002/0059786 A1* | 5/2002 | Nagaoka | B01J 19/32 55/525 |
| 2002/0092414 A1* | 7/2002 | Nagaoka | B01J 19/32 87/8 |
| 2002/0146358 A1 | 10/2002 | Smith et al. | |
| 2003/0125594 A1 | 7/2003 | Moore | |
| 2003/0146524 A1* | 8/2003 | Niknafs | B01J 19/30 261/94 |
| 2004/0031729 A1 | 2/2004 | Meier et al. | |
| 2004/0043493 A1* | 3/2004 | Kobayashi | B01J 20/286 422/70 |
| 2004/0084352 A1 | 5/2004 | Meier et al. | |
| 2004/0192862 A1 | 9/2004 | Glover et al. | |
| 2004/0225085 A1 | 11/2004 | Glover et al. | |
| 2005/0211644 A1* | 9/2005 | Goldman | C02F 3/302 210/786 |
| 2005/0240038 A1 | 10/2005 | Gobbel et al. | |
| 2005/0255014 A1 | 11/2005 | Glover | |
| 2006/0009648 A1 | 1/2006 | Gobbel et al. | |
| 2006/0108274 A1 | 5/2006 | Frey et al. | |
| 2006/0196826 A1 | 7/2006 | Glover | |
| 2006/0251555 A1 | 11/2006 | Warner et al. | |
| 2006/0275185 A1 | 12/2006 | Tonkovich et al. | |
| 2007/0158277 A1 | 7/2007 | Bachand et al. | |
| 2007/0265357 A1 | 11/2007 | Iversen et al. | |
| 2008/0044316 A1 | 2/2008 | Glover | |
| 2008/0245743 A1* | 10/2008 | Dew | B01D 24/04 210/745 |
| 2008/0257804 A1* | 10/2008 | Dew | B01D 24/04 210/170.08 |
| 2008/0257805 A1* | 10/2008 | Dew | B01D 24/002 210/170.08 |
| 2008/0296216 A1 | 12/2008 | Glover | |
| 2009/0044702 A1 | 2/2009 | Adamek et al. | |
| 2009/0146339 A1 | 6/2009 | Malone et al. | |
| 2009/0211441 A1 | 8/2009 | Reyes et al. | |
| 2009/0283479 A1 | 11/2009 | Warner et al. | |
| 2010/0209315 A1 | 8/2010 | Niknafs | |
| 2010/0243519 A1 | 9/2010 | Glover et al. | |
| 2010/0243520 A1 | 9/2010 | Glover et al. | |
| 2011/0200478 A1 | 8/2011 | Billiet | |
| 2012/0211430 A1* | 8/2012 | Choi | B01D 39/02 210/702 |
| 2012/0211438 A1 | 8/2012 | Glover | |
| 2012/0237434 A1 | 9/2012 | Blanchard et al. | |
| 2013/0178627 A1* | 7/2013 | Freitas, Jr. | B82B 3/0033 546/10 |
| 2013/0184461 A1* | 7/2013 | Freitas, Jr. | B82B 3/0047 546/10 |
| 2013/0306562 A1 | 11/2013 | Stifter et al. | |
| 2014/0291224 A1* | 10/2014 | Fujita | B01D 39/083 210/242.1 |
| 2015/0053627 A1 | 2/2015 | Silin et al. | |
| 2015/0129512 A1 | 5/2015 | Thiyagarajan | |
| 2016/0136603 A1 | 5/2016 | Parihar et al. | |
| 2017/0189834 A1* | 7/2017 | Glover | B01J 19/30 |
| 2017/0234339 A1 | 8/2017 | Glover | |
| 2018/0008952 A1 | 1/2018 | Glover | |
| 2018/0023598 A1 | 1/2018 | Glover | |
| 2018/0093207 A1* | 4/2018 | Glover | B01D 21/0087 |
| 2018/0093930 A1* | 4/2018 | Freitas, Jr. | C07B 61/00 |
| 2019/0046901 A1* | 2/2019 | Boyd | B01D 24/167 |
| 2019/0048903 A1 | 2/2019 | Glover et al. | |
| 2019/0177181 A1* | 6/2019 | St. Germain | C02F 1/004 |
| 2019/0217283 A1 | 7/2019 | Glover et al. | |
| 2019/0242412 A1 | 8/2019 | Glover et al. | |
| 2019/0285098 A1 | 9/2019 | Glover et al. | |
| 2019/0301498 A1 | 10/2019 | Glover | |
| 2019/0301499 A1 | 10/2019 | Glover | |
| 2019/0358620 A1 | 11/2019 | Glover | |
| 2020/0149564 A1 | 5/2020 | Glover | |
| 2020/0215524 A1 | 7/2020 | Glover | |
| 2020/0376413 A1* | 12/2020 | Glover | B01D 21/0012 |
| 2020/0376414 A1* | 12/2020 | Glover | B01D 21/0012 |
| 2021/0018022 A1 | 1/2021 | Glover | |

FOREIGN PATENT DOCUMENTS

| | | |
|---|---|---|
| CA | 2019928 | 12/1991 |
| CA | 2520071 | 4/2004 |
| CA | 2297113 | 2/2005 |
| CA | 2570527 | 12/2005 |

(56) References Cited

FOREIGN PATENT DOCUMENTS

| | | |
|---|---|---|
| CN | 202072546 | 12/2011 |
| CN | 203382593 | 1/2014 |
| DE | 585595 | 10/1933 |
| DE | 3539195 | 5/1986 |
| EP | 73150 | 10/1933 |
| EP | 260826 | 3/1988 |
| EP | 576096 | 12/1993 |
| EP | 639544 | 2/1995 |
| EP | 651041 | 5/1995 |
| EP | 719578 | 7/1996 |
| EP | 1001837 | 7/1998 |
| EP | 0899011 | 3/1999 |
| EP | 1606038 | 12/2005 |
| EP | 1755766 | 2/2007 |
| EP | 3040119 | 6/2016 |
| EP | 3397364 | 11/2018 |
| EP | 3414003 | 12/2018 |
| FR | 2480137 | 10/1981 |
| FR | 2851559 | 8/2004 |
| GB | 267877 | 1/1927 |
| GB | 374707 | 7/1932 |
| GB | 429616 | 6/1935 |
| GB | 933124 | 8/1963 |
| GB | 1097473 | 1/1968 |
| GB | 1442085 | 7/1976 |
| GB | 2108003 | 5/1983 |
| GB | 2149771 | 6/1985 |
| JP | 5237396 | 9/1977 |
| JP | S558819 | 1/1980 |
| JP | 5567309 | 5/1980 |
| JP | 5817818 | 2/1983 |
| JP | S58-024308 | 2/1983 |
| JP | S61-134300 | 6/1986 |
| JP | 61132097 | 8/1986 |
| JP | S61-180818 | 8/1986 |
| JP | 62114643 | 5/1987 |
| JP | S63-043632 | 3/1988 |
| JP | 4187297 | 7/1992 |
| JP | H06-205922 | 7/1997 |
| JP | 1028876 | 2/1998 |
| JP | 1057821 | 3/1998 |
| JP | 11128734 | 5/1999 |
| JP | 2000-028876 | 1/2000 |
| JP | 2000-246048 | 9/2000 |
| JP | 2003-120257 | 4/2003 |
| JP | 2004-515432 | 5/2004 |
| JP | 2004-250554 | 9/2004 |
| JP | 2004-530746 | 10/2004 |
| JP | 2004-537406 | 12/2004 |
| JP | 2006-55749 | 3/2006 |
| JP | 2006-205068 | 8/2006 |
| JP | 2006-523139 | 10/2006 |
| JP | 2007-514529 | 6/2007 |
| JP | 2008-545527 | 12/2008 |
| JP | 5543817 | 7/2014 |
| JP | 2015-085208 | 5/2015 |
| JP | 20016-13748 | 8/2016 |
| JP | 2018-61955 | 4/2018 |
| JP | 6324420 | 5/2018 |
| KR | 1221298 | 1/2013 |
| NL | 1009499 | 1/2000 |
| NZ | 542787 | 6/2009 |
| WO | 99/03561 | 1/1999 |
| WO | 2001/001536 | 1/2001 |
| WO | 2002/045838 | 6/2002 |
| WO | 2002/079346 | 10/2002 |
| WO | 2003/013725 | 2/2003 |
| WO | 2004/094039 | 11/2004 |
| WO | 2005/058472 | 6/2005 |
| WO | 2005/123221 | 12/2005 |
| WO | 2006/127671 | 11/2006 |
| WO | 2010/149908 | 12/2010 |
| WO | 2015/037730 | 3/2015 |
| WO | 2015/200513 | 12/2015 |
| WO | 2017/117492 | 7/2017 |
| WO | 2017/139597 | 8/2017 |
| WO | 2019/020705 | 1/2019 |
| ZA | 200508048 | 11/2006 |

OTHER PUBLICATIONS

Scheffler, Michael; Cellular Ceramics: Structure, Manufacturing, Properties and Applications; Die Beutsche Bibliotheck; 2005; 5 pages; Germany.

Schlichting, Boundary-Layer Theory; McGraw-Hill; (Translation of Grenzschicht-Theorie, Translated by Dr. J. Kestin), 1979; pp. 230-234.

Selee Corporation; Product Brochure; 6 pages; 1997.

Selee Corporation Home Page; Internet; downloaded Nov. 14, 1996; 3 pages.

Selee Corporation; Ceramic Foam for Thermal/Kiln Furniture Applications; Ceramic Foam Kiln Furniture Phusical Property Data Sheet; Nov. 14, 1996; 2 pages.

Sinter Metals; High Porosity SIKA-R . . . IS; Porous Metals Filter Elements; 3 pages.

Sinter Metals; Tool List, Seamleass SILKA-Elements; 2 pages.

Sinter Metals; Hight Porosity Sintered Materials; p. 1-16.

Snyder Filtration; Nanofiltration Membranes; Retrieved Jun. 15, 2016 from: http://synderfiltration.com/nanofiltration/membranes/; 4 pages; Membrane Technology.

Strom et al.; Advanced Reticulated Ceramics; Hi-Tech Ceramics; p. 14-19.

Sulzer; Structured Packings for Separation and Reactive Distillation Brochure; pp. 2-27; 2002-2003.

Sweeting et al.; High Surface Reticulated Ceramics for Catalytic Applications; Mat., Res. Soc. Symp. Proc., vol. 549; pp. 17-23; 1999.

Sweeting et al.; Reticulated Ceramics for Catalyst Support Applications; Hi-Tech Ceramics, Inc.; Nov. 30, 1994; 12 pages.

Tan-Atichat and Nagib, "Interaction of free-stream turbulence with screens and grids: a balance between turbulence scales" J. Fluid Mech (1982), vol. 114, pp. 501-528; Great Britain.

Wadley; Cellular Metals Manufacutring; Advanced Engineering Materials; 4; No. 10; pp. 726-733; 2002.

Woodward et al.; Akzo Chemicals' Guard Bed Technology; 16 pages; 1991.

U.S. Patent and Trademark Office; Non-Final Office Action, Issued in Connection with U.S. Appl. No. 11/893,190; dated Mar. 10, 2010; 6 pages; U.S.

Applicant; Amendment and Response, Filed in Connection with U.S. Appl. No. 11/893,190; dated Aug. 20, 2010; 4 pages; U.S.

U.S. Patent and Trademark Office; Final Office Action, Issued in Connection with U.S. Appl. No. 11/893,190; dated Nov. 3, 2010; 5 pages; U.S.

Applicant; Response to Final Office Action, Filed in Connection with U.S. Appl. No. 11/893,190; dated Jan. 3, 2011; 5 pages; U.S.

U.S. Patent and Trademark Office; Non-Final Office Action, Issued in Connection with U.S. Appl. No. 11/893,190; dated Jan. 19, 2011; 5 pages; U.S.

Applicant; Amendment and Response, Filed in Connection with U.S. Appl. No. 11/893,190; dated Jul. 19, 2011; 4 pages; U.S.

U.S. Patent and Trademark Office; Final Office Action, Issued in Connection with U.S. Appl. No. 11/893,190; dated Sep. 22, 2011; 6 pages; U.S.

Applicant; Amendment and Response, Filed in Connection with U.S. Appl. No. 11/893,190; dated Dec. 16, 2011; 5 pages; U.S.

U.S. Patent and Trademark Office; Non-Final Office Action, Issued in Connection with U.S. Appl. No. 11/893,190; dated Jan. 27, 2012; 7 pages; U.S.

U.S. Patent and Trademark Office; Non-Final Office Action, Issued in Connection with U.S. Appl. No. 11/893,190; dated Feb. 3, 2012; 7 pages; U.S.

Applicant; Amendment and Response, Filed in Connection with U.S. Appl. No. 11/893,190; dated Aug. 3, 2012; 6 pages; U.S.

U.S. Patent and Trademark Office; Final Office Action, Issued in Connection with U.S. Appl. No. 11/893,190; dated Oct. 23, 2012; 9 pages; U.S.

(56) References Cited

OTHER PUBLICATIONS

Applicant; Amendment and Response, Filed in Connection with U.S. Appl. No. 11/893,190; dated Dec. 24, 2012; 8 pages; U.S.
U.S. Patent and Trademark Office; Advisory Action Before the Filing of an Appeal Brief, Issued in Connection with U.S. Appl. No. 11/893,190; dated Jan. 11, 2013; 3 pages; U.S.
Applicant; Amendment and Response, Filed in Connection with U.S. Appl. No. 11/893,190; dated Feb. 25, 2013; 4 pages; U.S.
U.S. Patent and Trademark Office; Notice of Allowance and Fee(s) Due, Issued in Connection with U.S. Appl. No. 11/893,190; dated May 2, 2013; 8 pages; U.S.
U.S. Court of Appeals Federal Circuit; *Purdue Pharma L.P.* v. *Faulding Inc.*, 56 USPQ2d 1481 (CA FC 2000); Oct. 25, 2000; 11 pages.
Selected relevant excerpts from file history of U.S. Appl. No. 11/893,190 filed Aug. 15, 2007 and assigned to Applicant for present application.
Notice of Allowance for U.S. Appl. No. 10/867,015 (now U.S. Pat. No. 7,393,510, dated Jul. 1, 2008).
Observations submitted in connection to JP2017-226648; Jul. 17, 2018; 50 pages; Japan.
New Zealand Intellectual Property Office; Further Examination Report, issued in connection to application No. 743891; dated Jun. 24, 2019; 9 pages; New Zealand.
Japanese Patent Office; Observation, issued in connection to JP2018-541647;Jun. 19, 2019; 40 pages; Japan.
The Japan Petroleum Institute; Petroleum Refining Process; Kodansha Ltd.; May 20, 1998; 6 pages; Japan.
Chen, Xiaodong et al.; Improving the Strength of ZTA Foams with Different Strategies: Immersion Infiltration and Recoating; www.mdpi.com/journal/material;; May 30, 2017; 15 pages.
Intellectual Property Office of Singapore; Written Opinion, issued in connection to application No. 11201805367W; dated Aug. 16, 2019; 7 pages; Singapore.
Intellectual Property Office of Singapore; Written Opinion, issued in connection to application No. 11201805491X; dated Aug. 29, 2019; 6 pages; Singapore.
Intellectual Property India; Examination Report, issued in connection to application No. 201837023710; dated Aug. 28, 2019; 6 pages; India.
Government of Chile, Ministry of Economy, Promotion and Tourism; Examiner's Report and Search Report, issued in connection to application No. 201801799; dated Aug. 9, 2019; 14 pages; Chile.
Canadian Intellectual Property Office; Official Action and Examination Search Report, issued in connection with CA3009845; dated Aug. 28, 2019; 4 pages; Canada.
Saint-Gobain Norpro; Denstone ® Deltrap ® Support Media; 6 pages; printed Oct. 1, 2019; https://www.norpro.saint-gobain.com/support-media/denstone-deltap.
Saint-Gobain Norpro; Tools Help Optimize Selection of Denstone ® Bed Support Media; Apr. 4, 2019; 4 pages; https://www.norpro.saint-gobain.com/articles/tools-help-optimize-selection-denstone-bed-support-media-article.
Chilean Patent and Trademark Office; Examiner Report, issued in connection to application No. 2131-2018; 17 pages; dated Aug. 29, 2019; Chile.
Chilean Patent and Trademark Office; Search Report, issued in connection to application No. 2131-2018; 3 pages; dated Aug. 29, 2019; Chile.
Australian Government, IP Australia, Examination Report No. 1 for Standard Patent Application, Issued in connection to AU2017217834; 3 pages; dated Nov. 14, 2018; Australia.
Australian Government, IP Australia, Examination Report No. 1 for Standard Patent Application, Issued in connection to AU2016381170; 3 pages; dated Apr. 10, 2019; Australia.
Brazilian National Institute of Industrial Property; Technical Examination Report, issued in connection to PI0613275-8; dated Feb. 25, 2016; 16 pages; Brazil.
Canadian Intellectual Property Office; Official Action, issued in connection with CA3009825; dated Jun. 18, 2019; 4 pages; Canada.
Chilean Patent and Trademark Office; Abstract Publication of CL2131-2018; Sep. 28, 2018; 1 page; Chile.
European Patent Office; PCT International Search Report, Issued in Connection to PCT/US2005/020712; dated Mar. 3, 2006; 2 pages; Europe.
European Patent Office; PCT International Search Report, Issued in Connection to PCT/US2004/006366; dated Oct. 20, 2004; 2 pages; Europe.
European Patent Office; PCT International Search Report, Issued in Connection to PCT/US2006/019854; dated Jan. 17, 2007; 2 pages; Europe.
European Patent Office; PCT Written Opinion of the International Searching Authority, Issued in Connection to PCT/US2006/019854; dated Jan. 17, 2007; 5 pages; Europe.
European Patent Office; PCT International Search Report, Issued in Connection to PCT/US98/14768; dated Nov. 26, 1998; 3 pages; Europe.
European Patent Office; PCT International Search Report, Issued in Connection to PCT/US2016/069396; dated Mar. 31, 2017; 3 pages; Europe.
European Patent Office; PCT Written Opinion of the International Searching Authority, Issued in Connection to PCT/US2016/069396; dated Mar. 31, 2017; 6 pages; Europe.
European Patent Office; PCT International Search Report, Issued in Connection to PCT/US2017/017398; 5 pages; Europe.
European Patent Office; PCT Written Opinion of the International Searching Authority, Issued in Connection to PCT/US2017/017398; 9 pages; Europe.
European Patent Office; Communicaiton and Search Report, Issued in Connection to EP15192642.5; dated Jun. 2, 2016; 7 pages; Europe.
European Patent Office; Communicaiton Pursuant to Rules 161(1) and 162 EPC, issued in connection to EP17706648.7; dated Sep. 19, 2018; 3 pages; Europe.
European Patent Office; Communicaiton Pursuant to Rules 161(1) and 162 EPC, issued in connection to EP16834162.6; dated Aug. 8, 2018; 3 pages; Europe.
European Patent Office; Communication Pursuant to Article 94(3) EPC, issued in connection to EP15192642.5; dated Mar. 13, 2019; 5 pages; Europe.
European Patent Office; Communication Pursuant to Article 94(3) EPC, Issued in Connection to EP04716499.1; dated May 9, 2016; 4 pages; Europe.
European Patent Office; Communication pursuant to Article 94(3) EPC, issued in connection to EP04716499.1; dated Mar. 10, 2017; 5 pages; Europe.
European Patent Office; Communication Pursuant to Article 94(3) EPC, Issued in Connection to EP04716499.1; dated Mar. 15, 2013; 4 pages; Europe.
European Patent Office; Summons to attend oral proceedings pursuant to Rule 115(1) EPC, issued in connection to EP04716499.1; Feb. 12, 2018; 6 pages; Europe.
European Patent Office; Extended European Search Report, issued in connection to EP18201370.6; dated Apr. 9, 2019; 6 pages; Europe.
European Patent Office; Extended European Search Report, issued in connection to EP15192642.5; dated Jun. 2, 2016; 6 pages; Europe.
European Patent Office; Communication Pursuant to Article 94(3) EPC, issued in connection to EP98934597.0; dated Mar. 16, 2009; 3 pages; Europe.
European Patent Office; Communication Pursuant to Article 94(3) EPC, issued in connection to EP98934597.0; dated Jun. 21, 2006; 4 pages; Europe.
European Patent Office; Communication Pursuant to Article 96(2) EPC, issued in connection to EP98934597.0; dated Sep. 10, 2004; 4 pages; Europe.
European Patent Office; Communication Pursuant to Article 96(2) EPC, issued in connection to EP98934597.0; dated Dec. 11, 2002; 3 pages; Europe.
European Patent Office; Communication Pursuant to Article 96(2) EPC, issued in connection to EP98934597.0; dated Oct. 8, 2001; 2 pages; Europe.

(56) References Cited

OTHER PUBLICATIONS

European Patent Office; Communication Pursuant to Article 96(2) EPC, issued in connection to EP05760680.8; dated Jan. 28, 2009; 6 pages; Europe.
European Patent Office; Communication Pursuant to Article 96(2) EPC, issued in connection to EP05760680.8; dated Jul. 5, 2010; 5 pages; Europe.
Espacenet; English Translation of CN203382593U; Oct. 4, 2016; 7 pages; Europe.
Espacenet; English Translation of CN202072546U; Oct. 4, 2016; 11 pages; Europe.
Espacenet; English Translation of FR2851559A1; Oct. 4, 2016; 9 pages; Europe.
Espacenet; English Translation of WO2010149908A1; Oct. 4, 2016; 23 pages; Europe.
The International Bureau OT WIPO; PCT International Preliminary Report on Patentability, Issued in connection to PCT/2005/020712; dated Dec. 14, 2006; 5 pages; Switzerland.
The International Bureau OT WIPO; PCT International Preliminary Report on Patentability, Issued in connection to PCT/2004/006366; dated Oct. 1, 2005; 5 pages; Switzerland.
Japanese Patent Office; Notice of Reasons for Rejection, issued in connection to JP2010-246536; dated Sep. 7, 2012; 8 pages; Japan.
Japan Patent Office; Notice of Reasons for Rejection, issued in connection with JP2010-246536; dated Nov. 12, 2013; 6 pages; Japan.
Japan Patent Office; Certified Final Rejection, issued in connection with JP2010-246536; dated Jun. 25, 2014; 2 pages; Japan.
Japan Patent Office; Decision to Dismiss Amendment, issued in connection to JP2010-246536; dated Jun. 25, 2014; 3 pages; Japan.
Japanese Patent Office; Notice of Reasons for Rejection of Japanese Patent Application 2016-017373; dated Dec. 7, 2016; 11 pages; Japan.
Japanese Patent Office; Certified Decision of Dismissal of Amendment, issued in connection to JP2014-217190; 4 pages; Japan.
Japanese Patent Office; Certified Final Rejection, issued in connection to JP2014-217190; 3 pages; Japan.
Japanese Patent Office; Notice of Reasons for Rejection, issued in connection to JP2014-217190; dated Aug. 31, 2016; 6 pages; Japan.
Japanese Patent Office; Notice of Reasons for Rejection, issued in connection to JP2014-217190; dated Sep. 30, 2015; 8 pages; Japan.
Japanese Patent Office; Observation, issued in connection to JP2017-226648; Jul. 17, 2018; 50 pages; Japan.
Japanese Patent Office; Notice of Reasons for Rejection, issued in connection to JP2017-226648; dated Jan. 31, 2019; 10 pages; Japan.
Japanese Patent Office; Notice of Resons for Rejection, issued in connection to JP2018-553847; dated May 29, 2019; 10 pages; Japan.
Japanese Patent Office; Office Action, issued in connection to application No. 2019-140168; dated Sep. 2, 2020; 3 pages; Japan.
European Patent Office; Communication Pursuant to Article 94(3) EPC, issued in conneciton to application No. EP15192642.5; dated Sep. 10, 2020; 5 page; Europe.
Intellectual Property Office of Singapore; Invitation to Respond to Written Opinion, issued in connection to application No. 11201805491X; dated Aug. 18, 2020; 6 pages; Singapore.
Japanese Patent Office; Final Rejection, issued in connection to application No. 2018-541647; dated Jul. 22, 2020; 4 pages; Japan.
Japanese Patent Office; Notice of Reasons for Rejection, issued in connection to JP2018-541647; dated Aug. 28, 2019; 14 pages; Japan.
Korean Intellectual Property Office; Notification of Provisional Rejection, issued in connection to application No. 10-2018-7021988; dated Oct. 22, 2019; 7 pages; Korea.
European Patent Office; Communication Pursuant to Article 94(3) EPC, issued in connection to EP17706648.7; dated Oct. 24, 2019; 7 pages; Europe.
Korean Intellectual Property Office; Notification of Provisional Rejection, issued in connection to application No. 10-2018-7026274; dated Oct. 22, 2019; 14 pages; Korea.

Australian Government, IP Australia, Examination Report No. 2 for Standard Patent Application, Issued in connection to AU2016381170; 3 pages; dated Nov. 8, 2019; Australia.
Japanese Patent Office; Final Rejection, issued in connection to application No. 2017-226648; dated Feb. 26, 2020; 6 pages; Japan.
Chilean Patent and Trademark Office; Examiner Report No. 2., issued in connection to application No. 1799-2018; dated Jan. 24, 2020; 12 pages; Chile.
European Patent Office; Communication pursuant to Article 94(3) EPC, issued in connection to EP16834162.6; dated Feb. 4, 2020; 7 pages; Europe.
Japanese Patent Office; Office Action, issued in connection to application No. 2018-553847; dated Feb. 26, 2020; 3 pages; Japan.
Intellectual Property Office of Singapore; Invitation to Respond to Written Opinion, issued in connection with application No. 11201805491X; dated Mar. 3, 2020; 6 pages; Singapore.
Indian Patent Office; Examination Report, issued in connection to application No. 201837023720; dated Jan. 23, 2020; 6 pages; India.
Intellectual Property Office of Singapore; Invitation to Respond to Written Opinion, issued in connection with application No. 11201805367W; dated Mar. 2, 2020; 34 pages; Singapore.
National Institute of Industrial Property of Brazil; Office Action, issued in connection to application No. BR12018013488-0; dated Feb. 2, 2020; 4 pages; Brazil.
Canadian Intellectual Property Office; Office Action, issued in connection to application No. 3009825; dated Apr. 22, 2020; 3 pages; Canada.
Japanese Patent Office; Statement of Submission of Publication by third part, filed in connection to application No. 2019-140168; Apr. 21, 2020; 1 page; Japan.
Kabe, Toshiaki; Hydrotreating—Science and Technology; Oct. 20, 2000; pp. 367-379; IPC KK.
Canadian Intellectual Property Office; Examiner Report, issued in connection to application No. CA3009845; dated May 20, 2020; 3 pages; Canada.
Japanese Patent Office; Statement of Submission of Publication by third part, filed in connection to application No. 2018-541647; Jun. 25, 2020; 3 page; Japan.
Korean Intellectual Property Office; Office Action, issued in connection to patent application No. 10-2020-7011514; dated Jul. 20, 2020; 11 pages; Korea.
European Patent Office; Communication Pursuant to Article 94(3)EPC, issued in connection to application No. 182013703.6; dated Jul. 27, 2020; 5 pages; Europe.
New Zealand Intellectual Property Office; First Examination Report, issued in connection to application No. 743895; dated Jan. 31, 2019; 5 pages; New Zealand.
New Zealand Intellectual Property Office; First Examination Report, issued in connection to application No. 743891; dated Nov. 6, 2018; 10 pages; New Zealand.
Behrens et al.; Performance of a Monolith-like Structured; Chem. Biochem. Eng. Q. 15 (2); pp. 49-57; 2001.
Beihai Huihuang Chemical Packing Co. Lts., http://77520.pub.diysite.com/sc.deliver/main/0-4-5/410-ma.html? siteid=77520; 10 pages; May 5, 2003.
BT-750 314 D Ceramic Wagon Wheel Unit; 1 page.
Butcher; Reticulated Ceramic Foam as a Catalyst Support; Seminar for CatCon '98; Jun. 3-5, 1998; Ohio.
Ceramic Industry Cover page; and Table of Contents; vol. 147, No. 3; 2 pages; Mar. 1997.
Christy Refractories Company; Prox-Svers Catalyst Support Media; Apr. 1995.
Colombo; Porous Ceramics and Ceramic Components from Preceramic Polymers; http://www.matse.psu.edu/people/faculty/colombo.html; 5 pages.
Criterion; Top Bed Catalysts and Support; 1 page.
Criterion; Technical Bulletin: Loading Your Hydrotreating Reactor for Maximum Activity; Criterion Catalysts & Technologies; 3 pages; 2008.
Crystaphase Products, Inc.; Product Data Information: Ceramic Support—Recycled Silica Alumina; 1 page.

(56) References Cited

OTHER PUBLICATIONS

Fay; A Three-Point Generalization of the Ellipse; International Journal of Mathematical Education in Science and Technology; Jan. 2002; vol. 33, Issue 1; pp. 111-123.
FOSECO Home Page; Internet; p. 1-3; Feb. 21, 1997.
Fulton; CE Refresher: Catalyst Engineering, Part 2, Selecting the Catalyst Configuaration; May 1986 Chemical engineering; pp. 97-101.
Gibson; Cellular Solids, MRS Bulletin; www.mrs.org/publications/bulleting; pp. 270-274; Apr. 2003.
Gibson et al.; Cellular Solids: Structure and Properties; Second Edition, Cambridge Solid State Science Series, Cambridge University Press; 71 pages; 1997.
GKN Sinter Metals; Design Ideas and Application—Porous Discs; 4 pages.
Green et al.; Cellular Ceramics: Intriguing Structures, Novel Properties, and Innovative Applications; www.mrs.org/publications/bulletin; pp. 296-300; Apr. 2003.
Haldor Topsoe, Inc.; Material Safety Data Sheet Inert Topping TK-10; p. 1-4; 1992.
Haldor Topsoe; Topsoe Graded Bed Solutions; 3 pages.
Hickman et al.; Production of Syngas by Direct Catalytic Ocidation of Methane; Science; vol. 256; p. 343-346; Jan. 15, 1993.
Hi-Tech Ceramics; Reticel, Designing the Future with Advanced Reticulated Ceramics; Product Brochure; 6 pages.
Hung et al.; Translation of DE3539195, Hydroprocessing Catalyzer with Specific Geometric Shate; 23 pages; May 2000.
Ivars Peterson's MathLand; Beyond the Ellipse; The Mathematical Association of America; Sep. 2, 1996; 3 pages.
Kim et al.; Effect of Inert Filler Addition on Pore Size and Porosity of Closed-Cell Silicon Oxycarbide Foams; Journal of Materials Science 39; pp. 3513-3515; 2004.
Koch; Reactor Inemals by Koch, Your Way; 1 page.
Loehrke and Nagib, Agard Report No. R-598 Experiments on Management of Free-stream Turbulence 1972.
Materials 2017, 10(7), 735; "Improving the Strength of ZTA Foams with Different Strategies: Immersion Infiltration and Recoating;" https://doiorg/10.3390/ma10070735; 15 pages; Jul. 1, 2017.
Mills; Ceramic Technology Provides Refining Solutions, Saint-Gobain Norpro; pp. 1-17; 2003.
Mills; Ceramic Guard Bed Materials; Norton Chemical Process Products Corporation; Jun. 3-5, 1998; 24 pages; US.
Natural / Food Foams; 8 pages.
Norton Chemical Process Products Corporation, MacroTrap Guard Bed Media; 6 pages: 1998.
Norton Chemical Process Products Copr.; Denstone Inert Catalyst Bed Supports; 10 pages; 1992; Ohio.
NPRA Q&A Session on Refining and Petrochemical Technology; Section B. Hydrotreating; p. 85-101; 1990.
NPRA Q&A Session on Refining and Petrochemical Technology: Section B. Hydrotreating; p. 98-118; 1991.
NPRA Q&A Session on Refining and Petrochemical Technology: Section B. Hydrotreating; p. 104-135; 1992.
NPRA Q&A Session on Refining and Petrochemical Technology: Section B. Hydrotreating; p. 94-112; 1993.
NPRA Q&A Session on Refining and Petrochemical Technology: Section B. Hydrotreating; p. 98-139; 1994.
NPRA Q&A Session on Refining and Petrochemical Technology: Section B. Hydrotreating; p. 96-123; 1995.
NPRA Q&A Session on Refining and Petrochemical Technology: Section B. Hydrotreating; p. 131-160; 1996.
Olujic et al.; Distillation Column Internals/Configurations for Press . . . , Chem. Biochem, Eng. Q. 17 (4); pp. 301-309; 2003.
Perry's Chemical Engineers' Handbook, 7th Ed., McGraw-Hill, 1997, pp. 6-33-6-34.
PetroWare, Incl; 86 Catalyst Support Media; Premium Quality from Beginning to End; 21 pages; Ohio.
Petrotech, vol. 4, pp. 382-383; 1981.
Product Bulletin: Criterion 855 MD "Medallions" Inert Catalyst Support; Aug. 1998; 2 pages.
Queheillalt et al.; Synthesis of Stochastic Open Cell Ni-Based Foams; Scripta Materialia 50; pp. 313-317; 2004.
Rashmi Narayan; Particle Capture from Non-Aqueous Media on Packed Beds; Dept. of Chemical and Materials Engineering; 116 pages; Fall 1996; Edmonton, Alberta.
Rauschert; Hiflow Rings Brochure; 5 pages.
Saxonburg Ceramics Incorporated; Product Material Specifications.
Japanese Patent Office; Final Office Action, issued in connection to application No. 2018-553847; dated Jan. 6, 2021; 11 pages; Japan.
Canadian Patent Office; Office Action, issued in connection to application No. 3009825; dated Feb. 17, 2021; 3 pages; Canada.
Korean Intellectual Property Office; Notice of First Refusal Ruling, issued in connection to application No. 10-2018-7021988; dated Mar. 26, 2021; 8 pages; Korea.
Brazilian National Institute of Industrial Property; Technical Examination Report, issued in connection to PI0613275-8 ; dated Feb. 24, 2021; 18 pages; Brazil.
Japanese Patent Office; Final Office Action, issued in connection to application No. 2017-226648; dated Feb. 24, 2021; 29 pages; Japan.

* cited by examiner

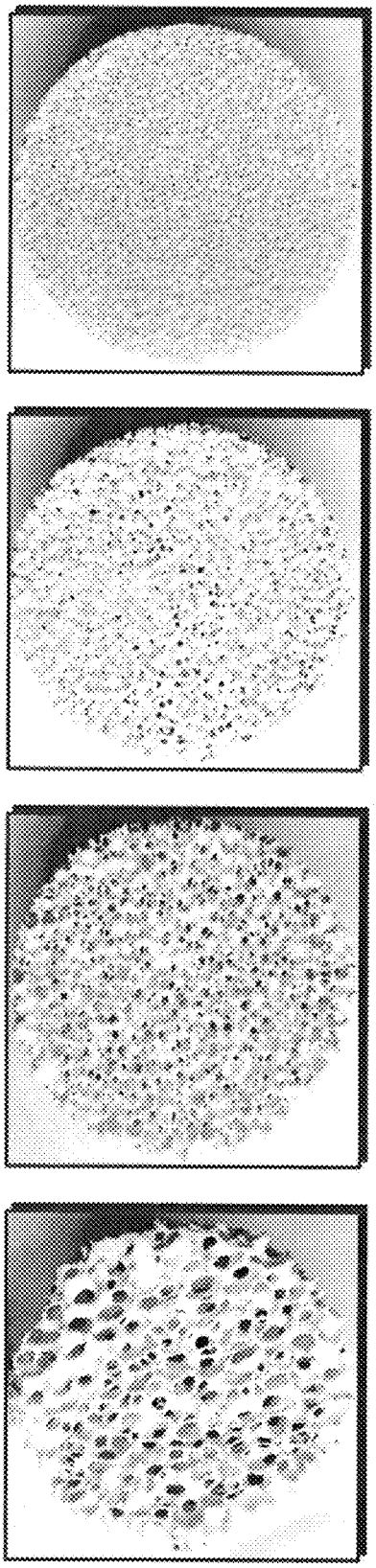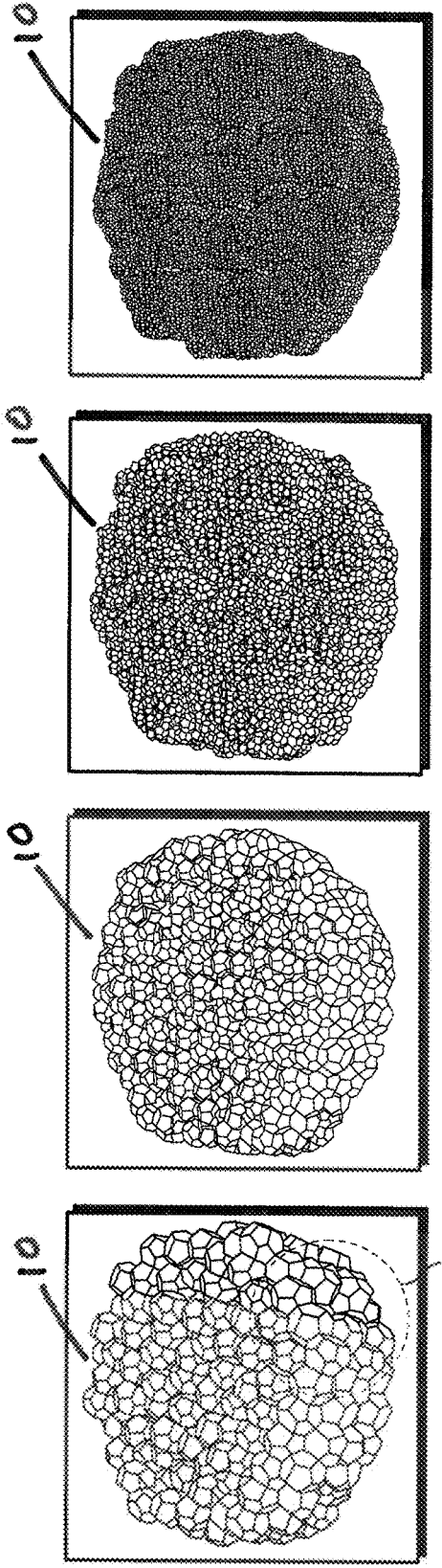

STRUCTURED ELEMENTS AND METHODS OF USE

RELATED APPLICATIONS

This application is a divisional application and claims the benefit, and priority benefit, of U.S. patent application Ser. No. 15/393,573, filed Dec. 29, 2016, which claims the benefit, and priority benefit, of U.S. Provisional Patent Application Ser. No. 62/273,590, filed Dec. 31, 2015, and U.S. Provisional Patent Application Ser. No. 62/294,718, filed Feb. 12, 2016, the contents of each are incorporated by reference herein in their entirety.

BACKGROUND

Field of the Invention

The presently disclosed subject matter relates to materials and methods for enhanced treatment of streams to, from and/or within process units.

Description of the Related Art

It is known in the art to tailor various streams flowing to, from and/or within process units in industrial facilities in order to to improve the efficiency and economics of the process units contained in the facilities. For example, undesired species in streams can foul, clog, contaminate, poison or degrade unit internals. These undesired species can also have negative effects on the performance of units contiguous to, downstream of, or integrated with such units. Additionally, process unit performance depends on the effective division and distribution of streams entering and within the process unit in order to facilitate optimum contact with internals within the process unit. Improvements in this field of technology are desired.

SUMMARY

The presently disclosed subject matter relates to materials and methods for enhanced treatment of streams to, from and/or within process units.

In certain illustrative embodiments, a method of flow division and distribution and of filtration and mitigation of undesired species from a stream to a unit is provided. The stream can be passed through and contacted with the surfaces of structured elements disposed in the unit, the structured elements being present in an amount sufficient to facilitate flow division and distribution of the stream and to mitigate the undesired species in the stream. The structured elements can have a contact surface with a surface area ranging from 200 to 800,000 square meters per cubic meter of structured elements. The structured elements can also have a filtration capability able to effectively remove particulates of sizes from 100 nanometers to 11 millimeters.

In certain aspects, the structured elements can have a contact surface with a surface area of at least 10,000 square meters per cubic meter of structured elements. The structured elements can also have a contact surface with a surface area of up to 800,000 square meters per cubic meter of structured elements. The structured elements can also have a contact surface with a surface area ranging from 10,000 to 800,000 square meters per cubic meter of structured elements.

In certain aspects, the structured elements can comprise one or more interconnected unit cells, each unit cell having a frame and a plurality of faces. The individual faces can be open, partially open or entirely closed. The frame and plurality of faces of each unit cell can form a three dimensional structure. The three dimensional structure can be a polyhedron, exemplified by the Weaire-Phelan foam-like structure. The polyhedron can be a regular polyhedron or an irregular polyhedron. The three dimensional structure can be a monolith. The monolith can have parallel and non-intersecting channels. The monolith can have irregular, non-intersecting channels. At least 10% of the total area of the faces of the unit cells can be partially or totally obstructed. The unit cells can each have a diameter in the range from 0.5 to 50 millimeters. The structured element can have a plurality of interconnected unit cells comprising a plurality of tortuous flow passageways through the structured element and the stream can be passed through and contacted with the surfaces of the plurality of tortuous flow passageways.

In certain aspects, the structured element can additionally include a plurality of asperities formed on the unit cells comprising the structured element. The asperities can include one or more of channels, flutes, spikes, fibrils and filaments. The contact surface of the structured element can comprise the surfaces of the plurality of tortuous passageways as well as the interconnected unit cells including their frames, their faces and their asperities.

In certain illustrative embodiments, a method of mitigation of undesired species from a stream to a process unit is provided. The stream can be passed through one or more structured elements in the unit, the structured elements being present in an amount sufficient to mitigate the undesired species in the stream. The stream can be contacted with the surfaces of the structured elements to mitigate the undesired species in the stream. The structured elements can have a contact surface with a surface area ranging from 200 to 800,000 square meters per cubic meter of structured elements and a filtration capability able to effectively remove particulates of sizes from 100 nanometers to 11 millimeters. In certain aspects, the structured elements can also have a contact surface with a surface area of at least 10,000 square meters per cubic meter of structured elements. The structured elements can also have a contact surface with a surface area of up to 800,000 square meters per cubic meter of structured elements. The structured elements can also have a contact surface with a surface area ranging from 10,000 to 800,000 square meters per cubic meter of structured elements.

In certain illustrative embodiments, a method of facilitating flow division and distribution of a stream to a process unit is provided. The stream can be passed through structured elements in the unit, the structured elements being present in an amount sufficient to facilitate flow division and distribution of the stream. The stream can be contacted with the structured elements to facilitate flow division and distribution of the stream. The structured elements can have a contact surface with a surface area ranging from 200 to 800,000 square meters per cubic meter of structured elements and a filtration capability able to effectively remove particulates of sizes from 100 nanometers to 11 millimeters. In certain aspects, the structured elements can also have a contact surface with a surface area of at least 10,000 square meters per cubic meter of structured elements. The structured elements can also have a contact surface with a surface area of up to 800,000 square meters per cubic meter of structured elements. The structured elements can also have a contact surface with a surface area ranging from 10,000 to 800,000 square meters per cubic meter of structured elements.

BRIEF DESCRIPTION OF THE DRAWINGS

FIGS. 11A-D are images of conventional porous filtration media having various sized openings.

FIGS. 12A-D are images of the presently disclosed structured elements having various sized openings in accordance with illustrative embodiments of the presently disclosed subject matter.

Figure 1:
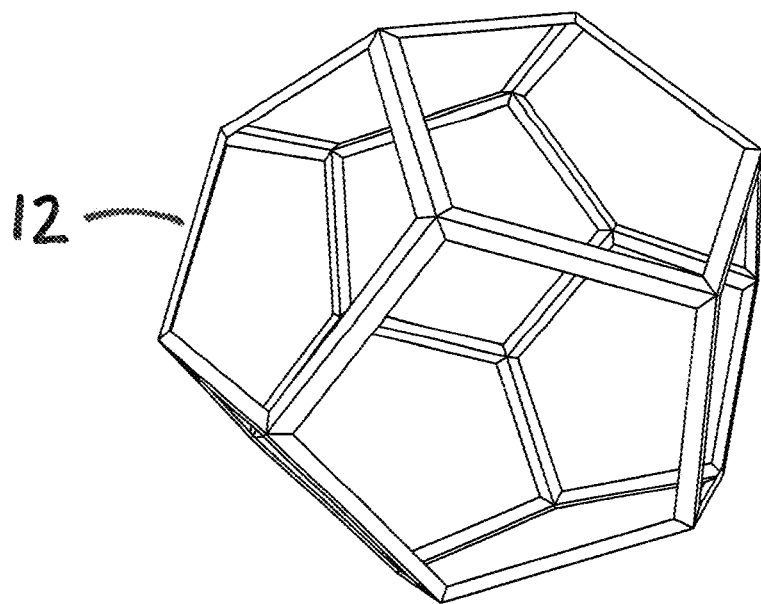
FIG. 1 is a perspective view of a unit cell for a structured element, the unit cell having a dodecahedron shape, in accordance with an illustrative embodiment of the presently disclosed subject matter.

While the presently disclosed subject matter will be described in connection with the preferred embodiment, it will be understood that it is not intended to limit the presently disclosed subject matter to that embodiment. On the contrary, it is intended to cover all alternatives, modifications, and equivalents, as may be included within the spirit and the scope of the presently disclosed subject matter as defined by the appended claims.

DETAILED DESCRIPTION

The presently disclosed subject matter relates to materials and methods for enhanced treatment of streams to, from and/or within process units. Units typically have internals to tailor streams entering and/or within the unit. Units also have internals to undertake desired unit operations, such as, for example, catalytic reactions and/or mass transfer. Stream treatment functions can include attracting, retaining and/or otherwise mitigating undesired species and/or ensuring effective stream flow division and distribution. The undesired species can include, without limitation, solid particulates, molecular species and entrained fluids.

Units can have streams entering the units as feeds, internal streams (such as recycle streams) within the units and streams exiting the units as products. The handling of these streams can involve a variety of activities including but not limited to (i) mitigating undesired species, (ii) ensuring effective stream flow division and distribution, (iii) performing desired unit operations such as chemical reactions and mass transfer including component separation, and (iv) generating and recovering streams as finished products or as feeds to other units. These activities can be carried out in discrete zones within units or combined as appropriate.

As an example of a simple configuration frequently utilized in industry, many units have a stream treating zone positioned upstream of a stream processing zone, both contained within the same unit. In such a configuration and in the majority of configurations utilized in industry, the roles of the treating zone are to provide to the processing zone a stream whose flow is effectively divided and distributed and/or that is substantially free of undesired species. However, many other configurations of these functionalities and combinations of these functionalities may be designed into units.

In some cases, treating zones can be installed for the sole purpose of dividing and distributing stream flow, or for the sole purpose of mitigating undesired species. Treating zones can be composed of separate layers of materials specifically designed to accomplish these purposes. For example, layers of different forms of media (including different sizes or shapes or structures or compositions or the like) can be installed with each layer targeted at mitigating a specific set of undesired species. Layers can be composed of media whose purposes are to both mitigate undesired species and facilitate stream division and distribution. Layers may be installed in any order and in any location as dictated by the functions to be performed. Units may have only one treating zone or one processing zone, one of each, one of each and multiples of the other, multiples of both or combinations of both. Combination is meant to include zones which have both treating and processing functionalities.

Treating zones can have useful lives primarily dictated by their capacity to attract, retain and/or otherwise mitigate undesired species and/or their ability to effectively divide and distribute the flow of streams passed through them. Treating zones can become blocked or clogged over time and eventually exhaust their capacities to attract, retain, and mitigate undesired species and/or divide and distribute the flow of streams. As these capacities are exhausted, insufficiently-processed streams can progress into downstream zones. Treating zone exhaustion can result in increased pressure drop in the unit itself which can necessitate unit shutdown to rejuvenate (via, for examples, regeneration or partial or complete replacement) the contents of the treating zone and, perhaps, the contents of downstream zones.

A function of processing zones is to process the suitably tailored streams exiting the treating zones. Examples of such processing include (i) molecular conversion via thermal, pressure and/or catalytic means and (ii) component separation via distillation, extraction or the like. Some materials and media used in such processing zones can have a useful "on-oil" life. In process units, for example, where the media in the processing zone are catalysts, the capability of the catalytic media can degrade over time due to catalyst deactivation caused, for examples, by coking or by agglomeration or conversion of catalytic species. A typical response to processing zone catalyst deactivation is to increase unit temperature in order to sustain catalytic performance. Maximum allowed temperature, when reached, will require unit shutdown. Improved treatment zones can facilitate enhanced performance of catalytic processing zones by: [i] prolonging catalyst life via providing stream flows that are more dispersed and distributed, [ii] prolonging catalyst life via providing stream flows containing reduced concentrations of undesired species, and [iii] advantageously allowing the use of more productive catalyst media, i.e., more active media or more long-lasting media.

Various conventional means exist for attracting, retaining and/or otherwise mitigating undesired species in streams passing through treating zones. For example, absorbents or otherwise active materials can be used to render undesired chemical species inert, cause them to be ejected from the unit in an effluent stream or converted into larger particulate matter that can be effectively removed using traditional filtration solutions. Undesired chemical species including reaction products such as iron sulfides and the like can form small particulates. Existing filtration technologies have limitations regarding the particulate sizes they can remove and have limited abilities to deal with undesired chemical species.

Conventional filtration media are also utilized in treating zones within units. However, these media can become clogged and blocked, which causes increases in pressure drop across the filter system as well as the unit itself which may require that the entire unit be taken off-line to remove and replace spent filter media and systems.

Filter system backwashing has also been used to remove filtered particulates. These change-outs and/or cleanings require costly interruptions with accompanying costs due to unit downtime, filter system expenses and maintenance effort. Such change-outs and/or cleanings also incur operating risks associated with unit shutdowns, startups and maintenance.

Porous filtration media have been utilized to attract and retain undesired species found in streams. Conventional porous filtration media are typically composed of ceramics or metals capable of withstanding the severe operating conditions in industrial units. The primary filtration mechanism of such media has been thought to occur within the pores of the media. The ability of such media to effectively mitigate such species has hitherto been correlated with pore size distribution, typically measured by "ppi" or "pores per inch." Conventional porous filtration media can be commercially manufactured with ppi ranging from about 10 to 100. The ability of such media to attract and retain undesired species depends not only on its ppi but also on the internal surface area of the media. For example, 10 ppi conventional porous media has internal surface area of about 300 square meters per cubic meter of media and has the ability to attract and retain undesired species sized from about 650 to 2000 microns. A 100 ppi conventional porous media has internal surface area of about 2400 square meters per cubic meter of media and has the ability to attract and retain undesired species sized from about 40 to 500 microns. Mitigating undesired species with sizes below 40 microns is not commercially feasible with conventional media. Also, mitigating undesired species ranging in size from, say, 40 to 2000 microns would require utilization of multiple grades of conventional media, each with its own ppi structure and associated internal surface area. Attempts to mitigate species larger than the capable maximum (2000 microns for 10 ppi media and 500 microns for 100 ppi media) results in complete performance debilitation of conventional media.

Porous media is frequently used in treating zones of units to achieve flow division and distribution to downstream processing zones in the same units. The prevailing thinking regarding this subject has been that treating zone flow division and distribution is enhanced as decreased pore size provides increased division and distribution capability. The presently disclosed subject matter demonstrates that the amount and structure of the contact surface area of treating zone media determines the efficacy of stream flow division and distribution as well as undesired species mitigation.

Providing optimum stream treatment systems requires the proper selection, design, fabrication, installation, operation and maintenance of such systems. Key performance parameters to be considered include the robustness of the materials selected to attract, retain and/or otherwise mitigate undesired species and/or the configuration and assembly of such materials so as to provide effective stream division and distribution.

Processing zones can be located within the same unit as the treating zone or in a vessel downstream of the vessel containing the treating zone. Zones within units are utilized to treat and/or process streams. Some zones simultaneously treat and process streams. More typically, streams passing through treating zones are subsequently passed to processing zones.

In certain illustrative embodiments, the presently disclosed subject matter can be employed in zones that simultaneously treat and process streams or in stand-alone treating zones. Specifically, the presently disclosed subject matter can: (i) more fully utilize the capability of the unit internals to attract, retain and/or otherwise mitigate undesired species; (ii) more effectively divide and distribute streams to processing zones within units; (iii) reduce the costs of such treating zone solutions while also allowing for maximized utilization of capabilities of the processing zones of such units; and (iv) result in substantial increases in unit profitability.

In certain illustrative embodiments, the presently disclosed subject matter comprises structured elements with capabilities for stream flow division and distribution and mitigation of undesired species that exceed those of conventionally available materials. When used in units, the structured elements described herein have a number of advantages when compared to prior art materials. For treating zones within units, the advantages include: (i) reducing the depth of the treating zone required, (ii) attracting, retaining and/or otherwise mitigating undesired species unable to be handled by prior art materials and (iii) providing flow division and distribution to processing zones more effectively than prior art materials. For processing zones, the advantages include: (i) having the benefit of cleaner, better divided and/or distributed streams exiting from treating zones, (ii) allowing the utilization of more effective processing zone internals, e.g., more active catalyst types or morphologies, and (iii) creating additional processing zone space to increase loadings of catalysts, absorbents or other internals. For the unit as a whole, the advantages include: (i) reducing the need for unit disruptions, including downtimes, with attendant loss of unit productivity, (ii) reduced operating risks associated with such disruptions and (iii) increased unit reliability and profitability.

Conventional filtration systems in treating zones using porous media have been pore-centric with filtration thought to occur within the pores of the filter media. Recent studies have revealed that the primary filtration mechanism in such media is attraction, retention and/or otherwise mitigation of undesired species on the contact surfaces within the media. In certain illustrative embodiments, the presently disclosed subject matter comprises structured elements having contact surface architecture that is superior to that found in conventional filter media. The contact surface architecture is more amenable to attracting, retaining and/or otherwise mitigating undesired species and/or to facilitating stream flow division and distribution.

In certain illustrative embodiments, the structured elements have multifaceted, three-dimensioal geometry with significantly increased contact surface area relative to conventional material architecture. Structured elements can comprise interconnected unit cells, each unit cell having a frame and a plurality of faces. The individual faces can be open, partially open or closed. At least 10% of the total area of the faces of the unit cells can be closed. The structured elements can additionally include a plurality of asperities formed on the unit cells. Asperities can include one or more of channels, flutes, spikes, fibrils and filaments. The structured elements can have a plurality of tortuous passageways through the structure via the openings in the faces of the interconnected unit cells.

Representative three dimensional architectures of the structured element unit cells can include regular and irregular polyhedra and monoliths.

The contact surface of the structured elements can comprise the surfaces of both their tortuous passageways and their unit cells including the frames, faces and asperities of the unit cells. The contact surface of the materials of the presently disclosed subject matter exceeds that of prior materials.

These contact surfaces provide the primary vehicle for mitigating undesired species via attraction, retention, adhesion, absorption, coalescence, agglomeration, capillary action and the like. This results in increased mitigation of undesired species within treating zones which leads directly to improved unit performance.

In certain illustrative embodiments, the structured elements have tortuosity and boundary layer conditions which enhance the ability of the material to attract, retain and/or otherwise mitigate particulate and molecular species. For example, in certain illustrative embodiments, the presently disclosed materials can attract and retain species having sizes as small as 200 nanometers, and in certain illustrative embodiments, as small as 100 nanometers.

In certain illustrative embodiments, the structured elements can be engineered to have structural characteristics beyond the geometric bounds set by the natural formations of foams, gels and extrusions which are used to form conventional porous media. The structured elements can have "active" surface features that improve attraction, retention and/or other mitigation capabilities and enhance flow division and distribution.

For example, in certain illustrative embodiments, the active surface features can include: (i) engineered blockage or partial blockage of unit cell faces; (ii) designed roughness of surfaces plus designed surface asperities or irregularities such as channels, flutes, spikes, fibrils, filaments and the like; (iii) increased tortuous surfaces and surface area of passageways; (iv) regions allowing pooling and settling of liquids; and (v) increased laminar flow and boundary layer zones, wherein van der Waals adhesion forces are magnified.

Active surface features of pooling and settling regions include enhanced capture of small particles which, according to Stokes Law, require more time to pool and settle than larger particles.

Furthermore, it is known that van der Waals adhesion forces become dominant for collections of very small particles (i.e. 250 microns or smaller). Van der Waals adhesion forces are dependent on surface topography, and if there are surface asperities or protuberances which result in greater area of contact between particles or a particle and a wall, van der Waals forces of attraction as well as the tendency for mechanical interlocking increase.

In certain illustrative embodiments, the structured elements have an engineered architecture that elicits enhanced performance beyond existing porous or cellular materials due to improved surface architecture and conditions. The structured elements can have an enlarged contact surface area containing thin film boundary layers within which molecular attraction and retention plus Van der Waals adhesion forces are magnified.

In certain illustrative embodiments, surface features of the structured elements can include surfaces that are wholly or partially composed of, or coated with, materials that enhance mitigation of undesired species. An illustrative example is wash coating with a material which helps attract and retain metal molecular species such as arsenic and vanadium, both of which are powerful catalyst deactivators or poisons.

The structured elements provide increased opportunities for surface attraction, retention and coalescence of undesired species. In certain illustrative embodiments, the functional contact surfaces of the structured elements can include one or more of: (i) the faces of cells, (ii) the surfaces of struts connecting cells, (iii) the surfaces of nodes connecting struts, and (iv) the surfaces of asperities or irregularities caused by channels, flutes, spikes, fibrils or filaments in or on the surfaces of all the above. The functional contact surfaces of the structured elements can be manufactured or modified to enhance coalescence, chemical reaction, agglomeration of atoms into larger species, extraction, adsorption, and the like in the process units.

In certain illustrative embodiments, the structured elements can facilitate flow division and distribution in units. It has been learned that flow division and distribution enhancement can be attributed not only to tortuous mixing, but also, in certain illustrative embodiments, to the development of thin films on the surfaces of the structured elements. These films and surfaces can provide a vehicle for division and flow distribution. Thus, the focus of flow division and distribution performance is shifted from pore size and pore volume to contact surfaces, surface area and, importantly, surface asperities and irregularities.

In certain illustrative embodiments, the structured elements can have appropriately engineered architectures that attract, retain and/or otherwise mitigate a broader range of undesired species than conventional materials. This provides the important economic benefit of decreasing the number of layers of media "grades" (and the space required to contain them) in a unit's treating zone(s) and freeing valuable space for added unit internals (such as catalyst) in the unit's processing zone(s). In certain illustrative embodiments, the structured elements comprise materials having an internal void fraction of 60% or greater. In certain illustrative embodiments, the structured elements can begin with cells that are 0.5 to 50 millimeters in size.

In certain illustrative embodiments, the structured elements can comprise polyhedral shaped materials. The polyhedral shapes can include, for example, tetrahedra, cubes, octahedra, dodacahedra and isosahedra. The polyhedral shapes can be formed from a plurality of interconnected unit cells comprising polygonal shaped materials that are positioned together to form a combined structure. Further, the structured elements can comprise reticulated ceramics as well as any other cellular ceramics including monolithic structures.

Figure 2:
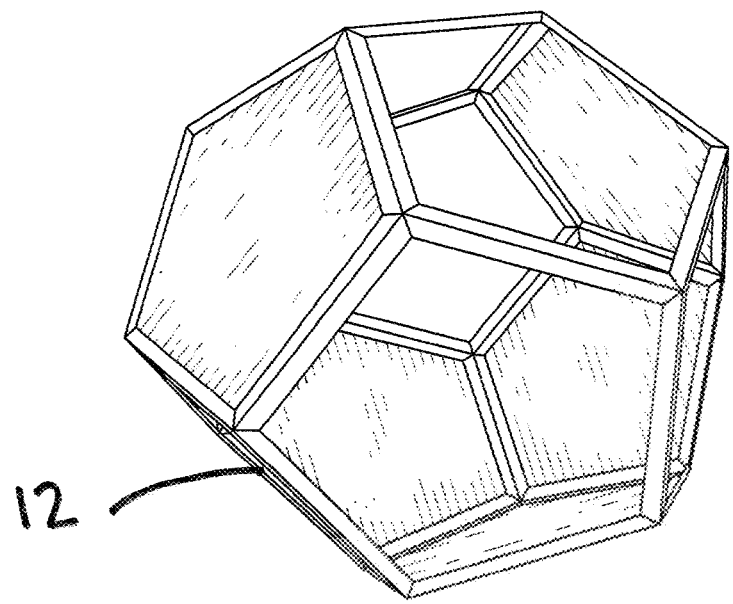
FIG. 2 is a perspective view of a unit cell for a structured element, the unit cell having a dodecahedron shape with a plurality of blocked openings in accordance with an illustrative embodiment of the presently disclosed subject matter.
Figure 3:
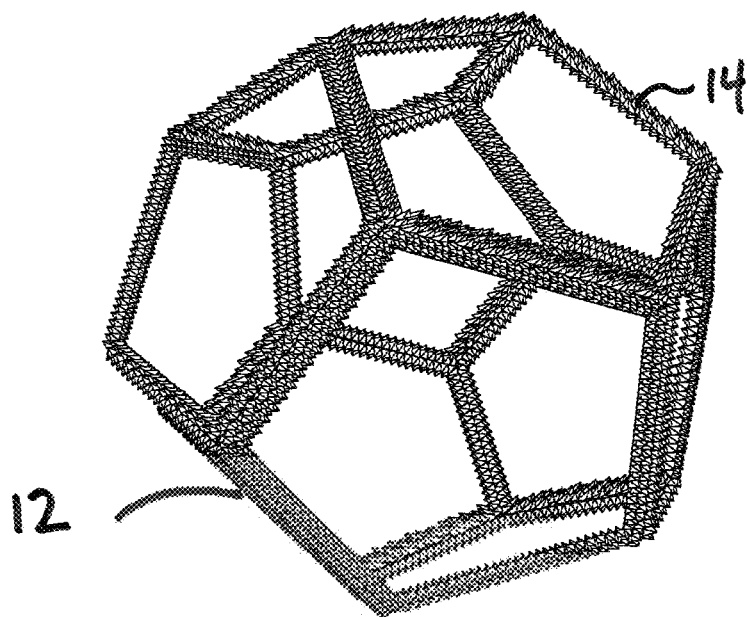
FIG. 3 is a perspective view of a unit cell for a structured element, the unit cell having a dodecahedron shape with a surface roughened by asperities and irregularities in accordance with an illustrative embodiment of the presently disclosed subject matter.
Figure 4:
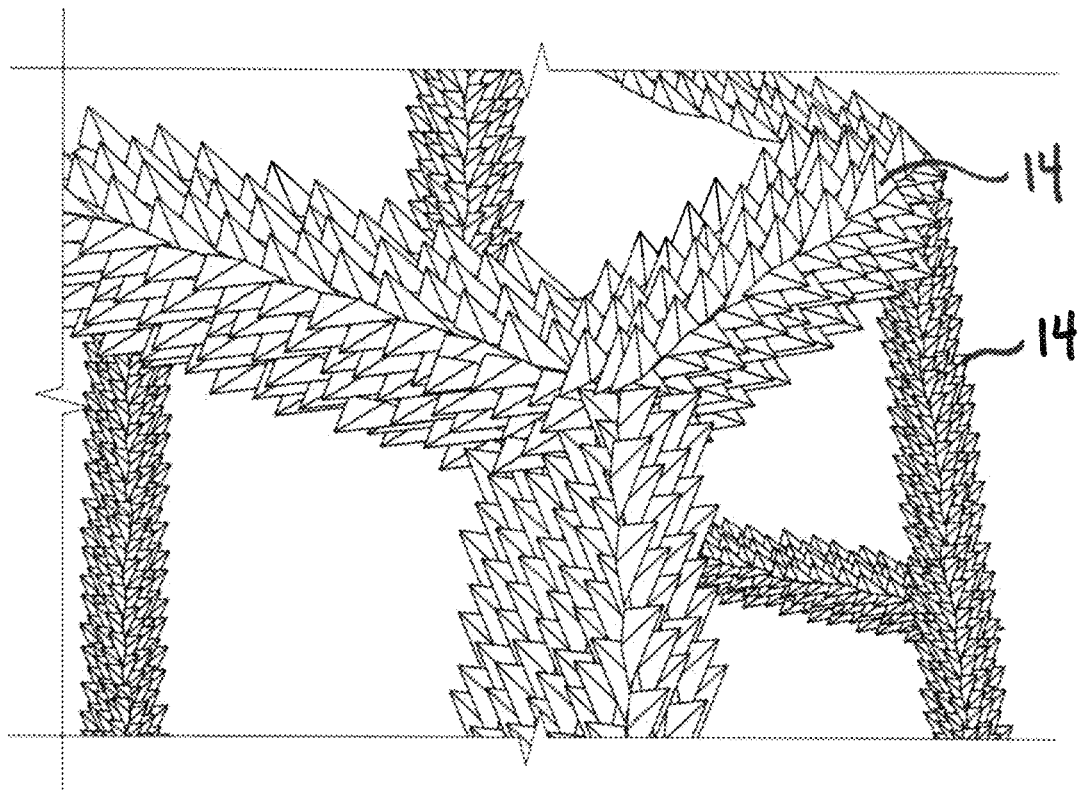
FIG. 4 is a zoomed-in perspective view of the unit cell of FIG. 3.
Figure 5:
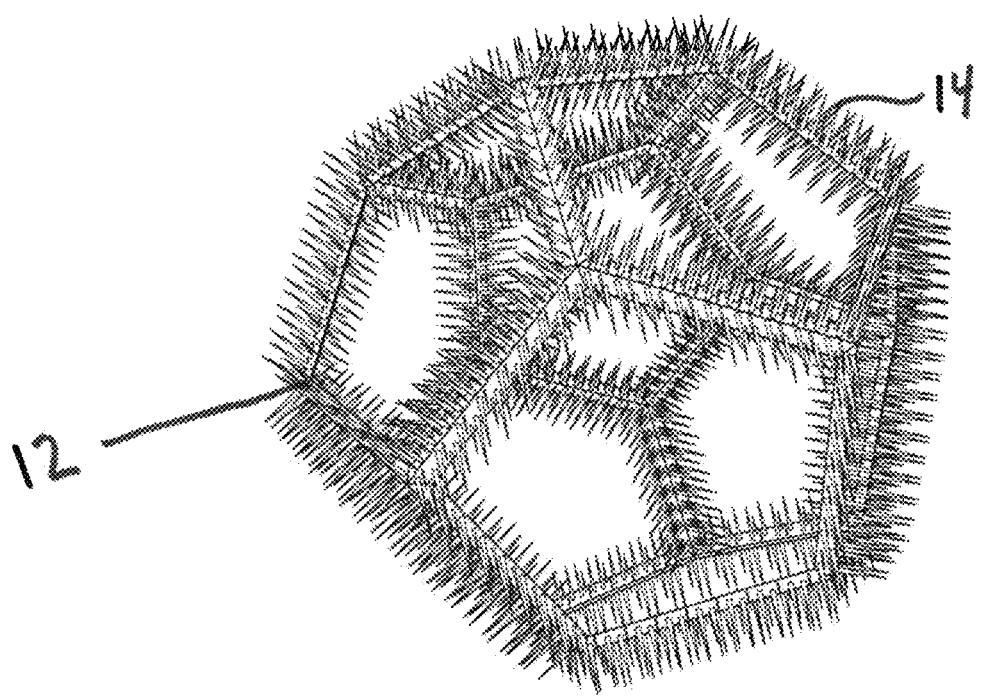
FIG. 5 is a perspective view of a unit cell for a structured element, the unit cell having a dodecahedron shape with a strutted or fibrillar surface in accordance with an illustrative embodiment of the presently disclosed subject matter.
Figure 6:
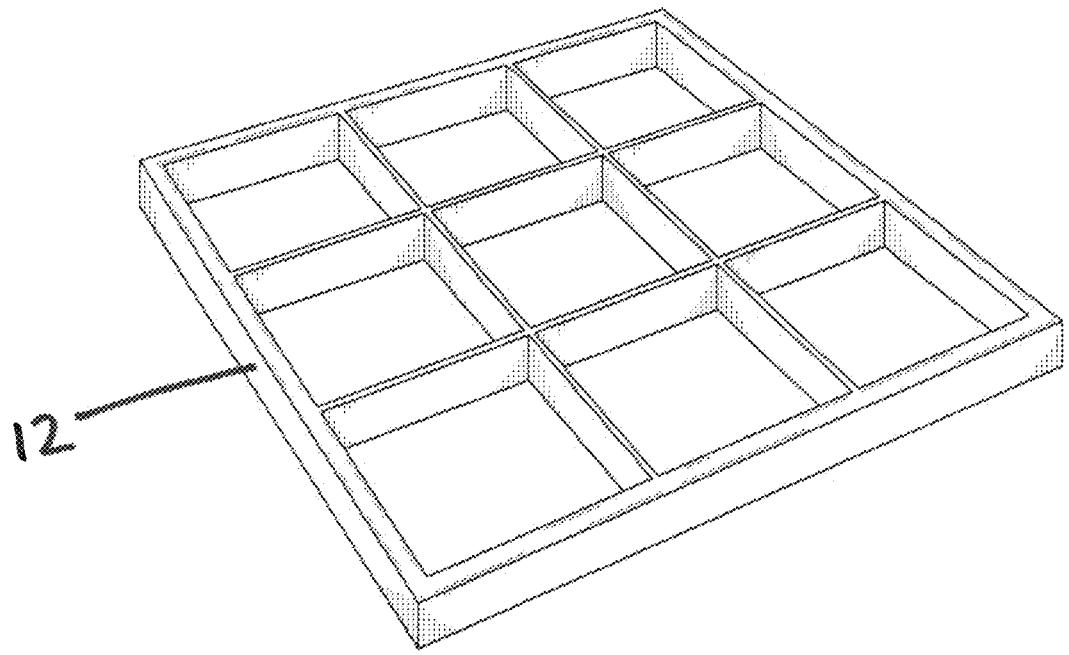
FIG. 6 is a perspective view of a structured element comprised of unit cells and having a monolithic shape in accordance with an illustrative embodiment of the presently disclosed subject matter.
Figure 7:
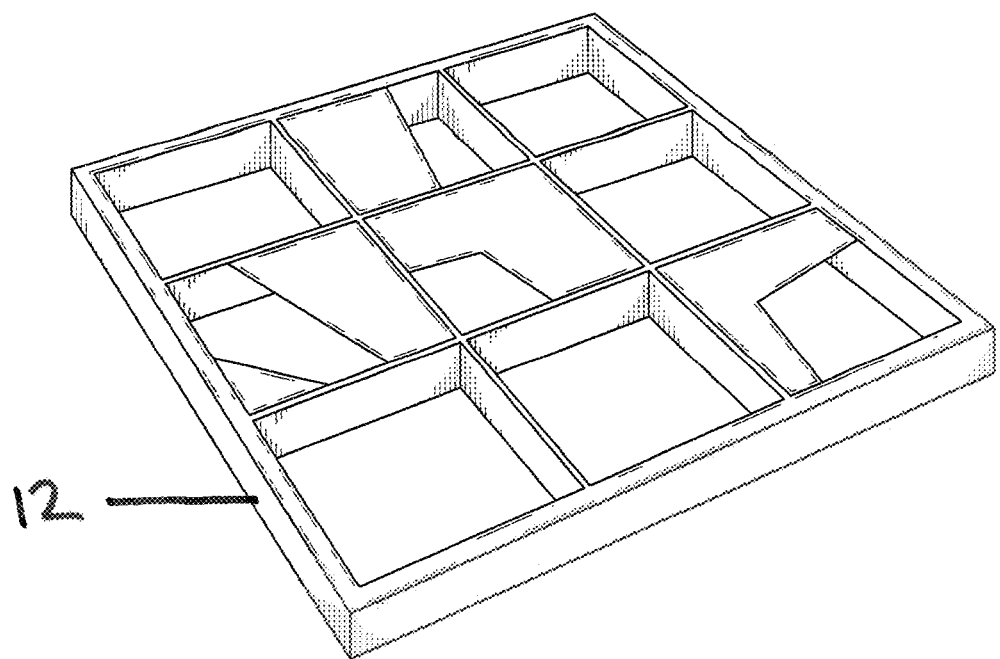
FIG. 7 is a perspective view of a structured element comprised of unit cells and having a monolithic shape and a plurality of blocked openings in accordance with an illustrative embodiment of the presently disclosed subject matter.
Figure 8:
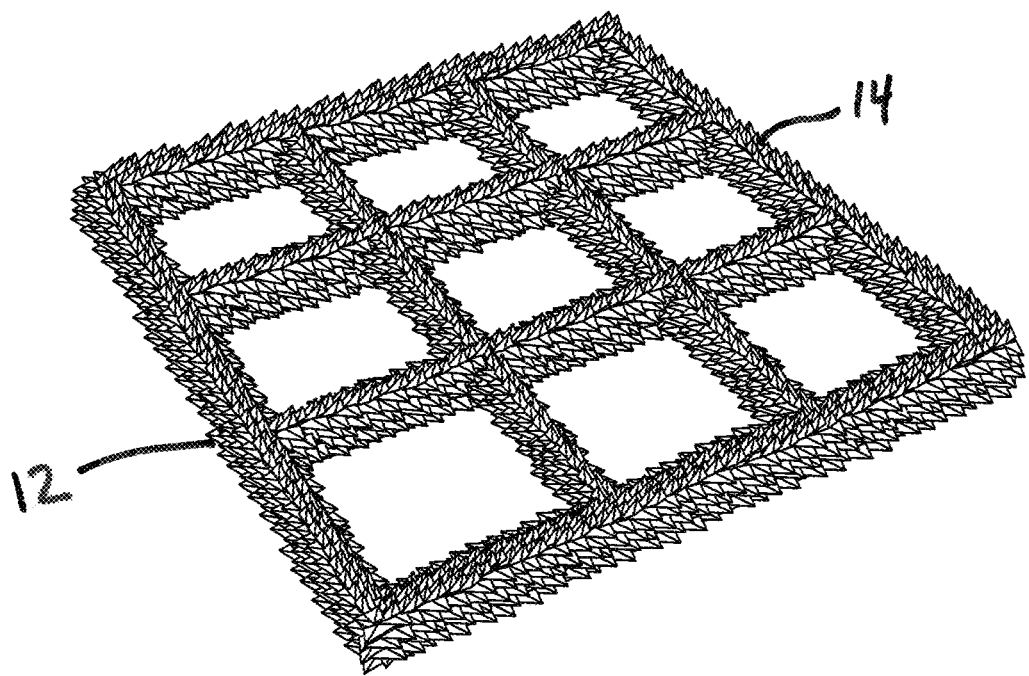
FIG. 8 is a perspective view of a structured element comprised of unit cells and having a monolithic shape with a roughened surface in accordance with an illustrative embodiment of the presently disclosed subject matter.
Figure 9:
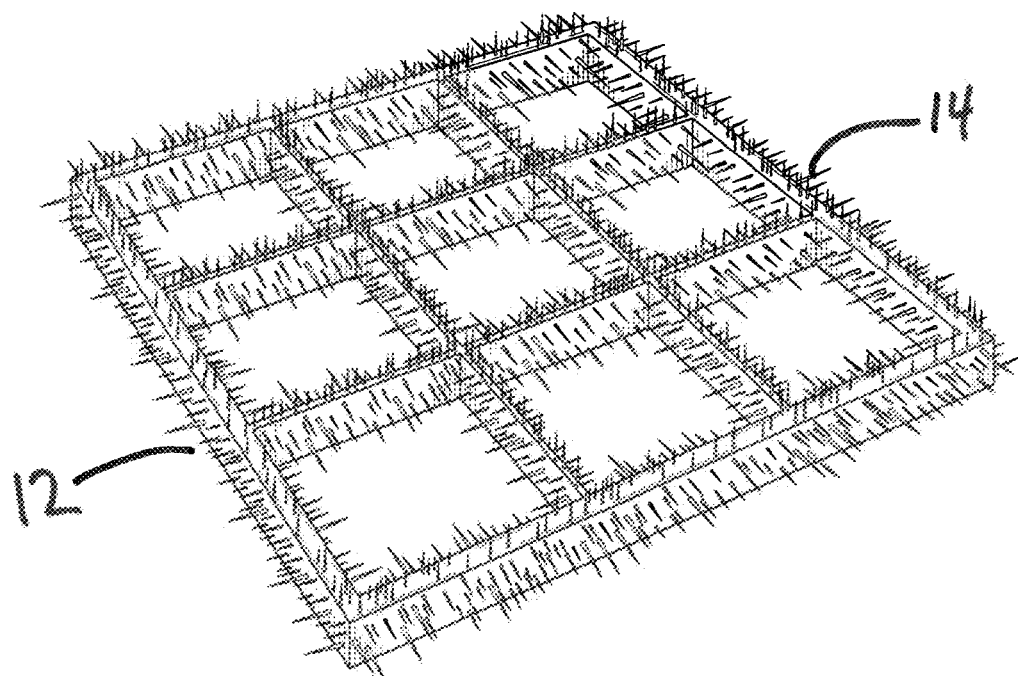
FIG. 9 is a perspective view of a structured element comprised of unit cells and having a monolithic shape with a strutted or fibrillar surface in accordance with an illustrative embodiment of the presently disclosed subject matter.

Various illustrative embodiments of the structured element unit cells are shown in FIGS. 1-5. FIG. 1 shows a standard dodecahedron-shaped unit cell, which can be for example, the building block for a reticulated ceramic. FIG. 2 shows the dodecahedron-shaped unit cell having approximately 50% blocked openings. FIG. 3 shows the dodecahedron-shaped unit cell having a roughened surface. FIG. 4 shows a close up view of the dodecahedron-shaped unit cell of FIG. 3, to further illustrate the roughened surface. FIG. 5 shows the dodecahedron-shaped unit cell having a fibrillar surface. FIGS. 12A-12D are representative views of the structured elements composed of a plurality of unit cells wherein the unit cells have different sizes (measured in pores per inch). FIG. 12E, a zoomed portion of FIG. 12A, illustrates the surface features of the structured elements that produce the significant increase in contact surface area relative to conventional materials, in certain illustrative embodiments. FIG. 6 shows a structured element having a standard monolithic structure. FIG. 7 shows the monolithic structure having approximately 50% blocked openings. FIG. 8 shows the monolithic structure having a roughened surface. FIG. 9 shows the monolithic structure having a spiked or fibrillar surface.

In certain illustrative embodiments, the structured elements comprise materials having a geometric contact surface area in the range from 200 to 800,000 square meters per cubic meter of said structured elements. In certain aspects, the structured elements can have a contact surface with a surface area of at least 10,000 square meters per cubic meter of structured elements. The structured elements can also have a contact surface with a surface area of up to 800,000 square meters per cubic meter of structured elements. The structured elements can also have a contact surface with a surface area ranging from 10,000 to 800,000 square meters per cubic meter of structured elements.

In certain illustrative embodiments, the range of contact surface area of the structured elements of the presently disclosed subject matter is significantly larger than the contact surface area range of prior art materials. Moreover, specific grades of structured elements have a significantly broader range of ability to attract and retain undesired species. As examples, structured elements corresponding to 10 ppi conventional media are capable of attracting and retaining species of size ranging from 20 to 2000 microns and structured elements corresponding to 100 ppi are capable of attracting and retaining species of size ranging from 0.1 to 500 microns.

Figure 10:
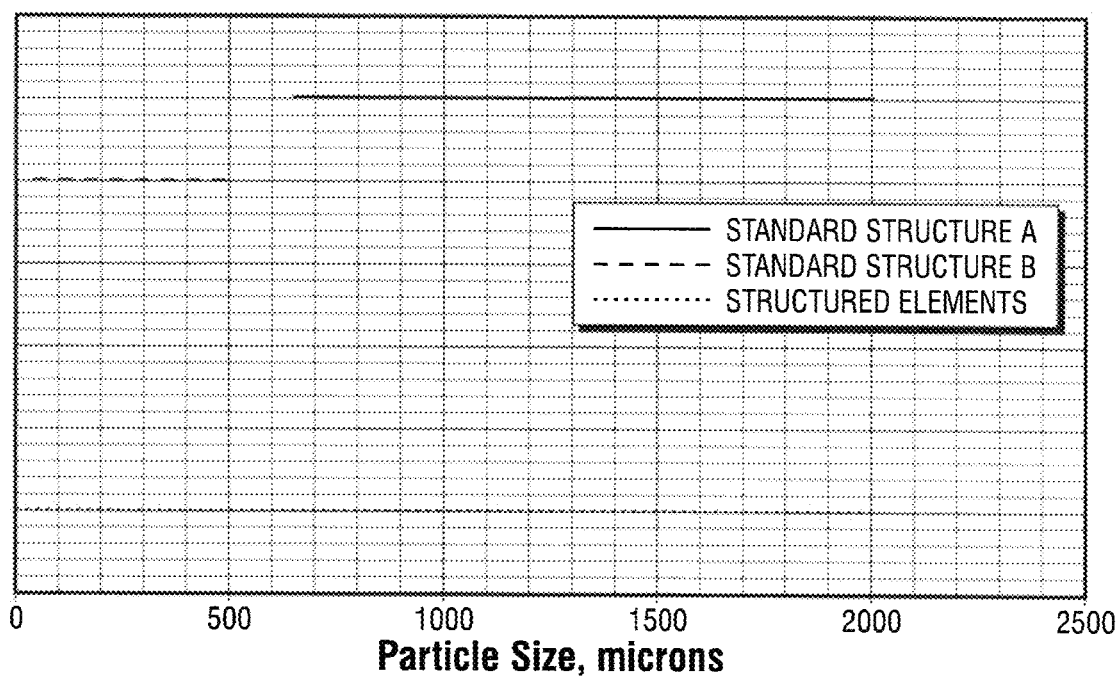
FIG. 10 is a graph comparing filtration capability for conventional materials and the presently disclosed materials in accordance with an illustrative embodiment of the presently disclosed subject matter.

A graphical comparison of filtration capability for conventional materials and the presently disclosed materials is shown in FIG. 10. The graph shows the filtration ranges for both prior art materials (as described in, e.g., Paragraph 28 herein) and the presently disclosed materials with particle sizes shown in microns on the x axis. The Standard Structure A line corresponds to the filtration capability of conventional prior art 10 ppm media. This media is capable of filtering particulate matter from 650 to 2000 microns in size. The Standard Structure B line corresponds to the filtration capability of conventional prior art 100 ppm media. This media is capable of filtering particulate matter from 40 to 500 microns in size. These two represent the upper and lower ppi limits of conventional materials that can be commercially manufactured and used. As shown in FIG. 10, there is a gap between the upper end of the B line (500 microns) and the lower end of the A line (650 microns). If a specific process application needed to filter particulates across the entire 40 to 2000 micron range, both the A and B structures would be required plus another structure (of approximately 50 ppi) to bridge the 500 to 650 micron gap. This would mean three different grades of media in three different layers in the unit must be utilized.

By comparison, the Structured Elements line of FIG. 10 shows the capability of only one grade of the presently disclosed materials, in certain illustrative embodiments. This grade, when used alone, can filter particulates ranging in size from 20 to 2000 microns, and thus corresponds with the entire range of both the Standard Structure A line and the Standard Structure B line, and beyond. Thus, as explained previously herein, the Structured Elements can filter particulates that are both smaller and larger than feasible with prior art media. For example, the Structured Elements can filter particulates as small as 0.1 microns (100 nanometers) and as large as 11 millimeters, in certain illustrative embodiments.

Figure 13:
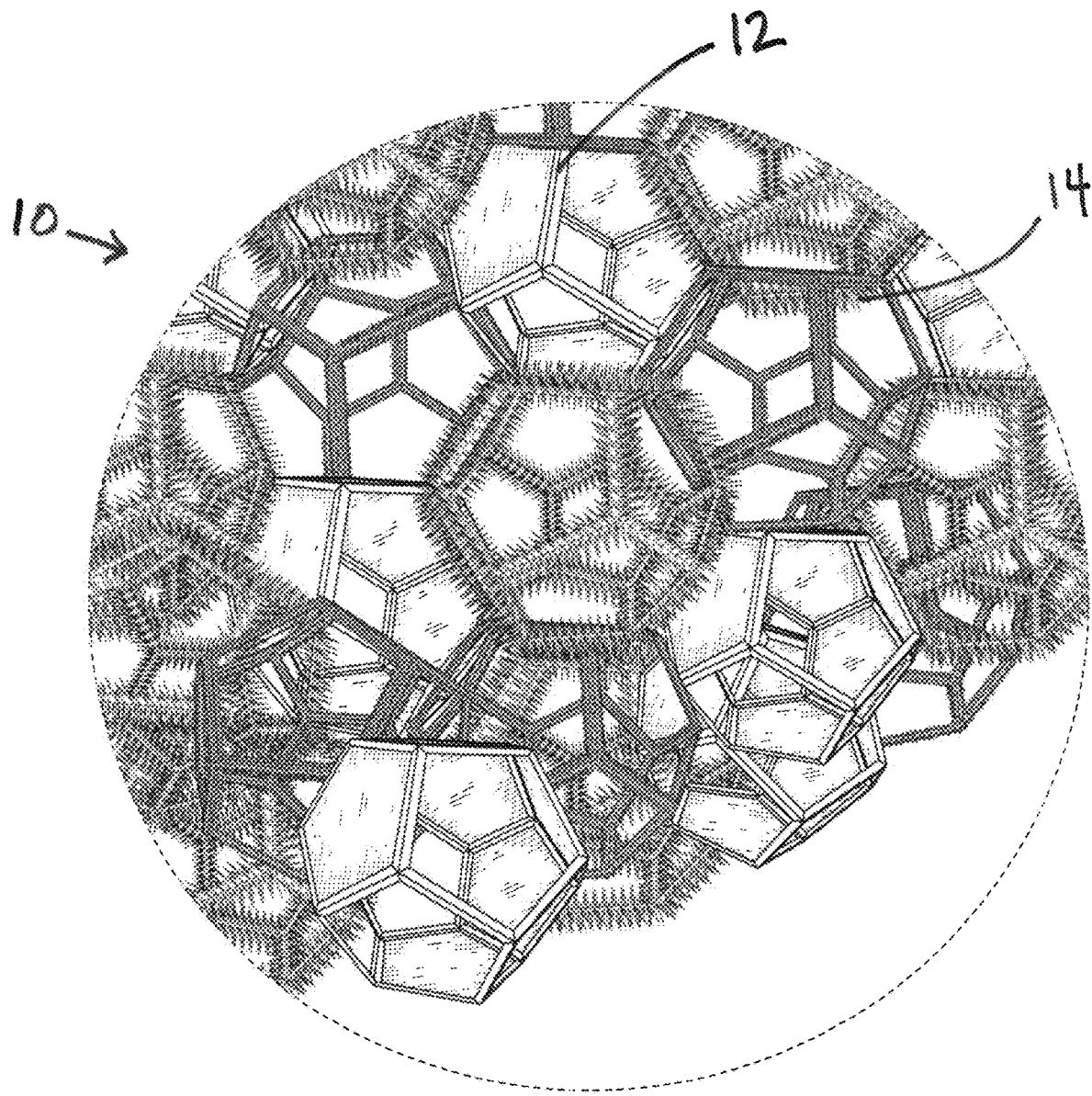
FIG. 13 is a zoomed-in perspective view of the structured element of FIG. 12A.

FIGS. 11A-11D and 12A-12D are comparative views of conventional materials and the presently disclosed structured elements according to certain illustrative embodiments. The conventional materials of FIGS. 11A-11D have sizes of approximately ten (10) (FIG. 11A), thirty (30) (FIG. 11B), fifty (50) (FIG. 11C) and eighty (80) (FIG. 11D) ppi, respectively. The structured elements of FIGS. 12A-12D are different and distinguishable in structure from those of FIGS. 11A-11D due to the presence of face blockage and surface roughness and asperities (as illustrated in FIG. 12E which is a zoomed portion of 12A) which advantageously provide a significant and measurable increase in contact surface area relative to conventional materials. According to certain illustrative embodiments, and as shown in FIG. 13, the unit cells that make up the structured elements can comprise a random mix of individual unit cells having, for example, various types of asperities and/or one or more blocked openings.

In certain illustrative embodiments, each of the structured elements in the images in FIGS. 12A-12D can contain a variety of blockages, surface roughness, and asperities. Geometrical models have been produced to estimate the relative increase of surface area that these different combinations are able to generate. For example, in certain illustrative embodiments, the structured element in FIG. 12A could have a surface area as low as 260 square meter per cubic meter and as high as 131,700 square meter per cubic meter. In certain illustrative embodiments, the structured element in FIG. 12B could have a surface area as low as 625 square meter per cubic meter and as high as 305,000 square meter per cubic meter. In certain illustrative embodiments, the structured element in FIG. 12C could have a surface area as low as 1223 square meter per cubic meter and as high as 556,500 square meter per cubic meter. In certain illustrative embodiments, the structured element in FIG. 12D could have a surface area as low as 1697 square meter per cubic meter and as high as 834,600 square meter per cubic meter. More in depth modeling has been performed to demonstrate surface areas exceeding 1,000,000 square meter per cubic meter provided sufficient structures and the preferred combination of blockages, roughness, and asperities. The structure in FIG. 12A could provide enough variability in surface area to perform the same function as FIGS. 11A-11D, vastly shrinking filtration system size and the number of layers required for proper function. Similar comparisons can be made about FIGS. 12B, C, and D, but it can also be said surface areas which could not be physically achieved in FIGS. 11A-11D are surpassed by more than 2 orders of magnitude in the structures represented in FIGS. 12A-12D, in certain illustrative embodiments.

Various methods of utilizing the structured elements in or in connection with a unit are disclosed herein. For example, in certain illustrative embodiments, a method of mitigating undesired species within and providing effective flow division and distribution of one or more fluid streams is provided. The mitigation can involve retention, capture, trapping, isolation, neutralization, removal, agglomeration, coalescence, transformation or otherwise rendering said undesired species impotent. The undesired species can include small particulates, entrained matter, undesired chemicals, extraneous contaminants, and the like. A treating zone of the structured elements can be provided whereby the structured elements: (i) have sufficient voidage, surface area and passageway tortuosity; (ii) have a plurality of surfaces within said elements sufficient to facilitate both mitigation of the undesired species and effective flow division and distribution; and (iii) have a plurality of tortuous flow passageways to facilitate both mitigation of undesired species on the surfaces of the structured elements and unimpeded passage of the streams thru the treating zone. The effluent from the treating zone can be fed to a processing zone located downstream in the same unit. Asperities and irregularities such as spikes and fibrils can be created on the surfaces of the structured elements. The faces of the structured elements can also be blocked or partially blocked. In another aspect, a method of removing contaminants from a contaminated feed stream is provided. The contaminated feed stream can be passed through a layer of structured elements, the layer of structured elements being in an amount sufficient to substantially filter the contaminant from the feed stream. The contaminated feed stream can be contacted with the surfaces of the structured elements to remove the contaminants from the contaminated feed stream.

In certain illustrative embodiments, the stream that is treated with the structured elements is an industrial process stream and the unit is an industrial process unit. For example, and without limitation, the industrial process stream can be a hydrocarbon or an inorganic stream, and the industrial process unit can be a hydrotreater, a still or an extractor.

It is to be understood that the presently disclosed subject matter is not to be limited to the exact details of construction, operation, exact materials, or embodiments shown and described, as obvious modifications and equivalents will be apparent to one skilled in the art. Accordingly, the presently disclosed subject matter is therefore to be limited only by the scope of the appended claims.

What is claimed is:

1. A method of distributing the flow of a fluid stream within a process unit, the method comprising:
    passing the fluid stream through a plurality of structured elements in the process unit, each structured element comprising one or more interconnected unit cells, each unit cell having a frame with a three-dimensional polyhedron structure and a plurality of faces, wherein the faces include a combination of open faces, partially open faces and closed faces, and wherein the frame, the partially open faces and the closed faces each have a plurality of differently-shaped asperities disposed on the surfaces thereof; and
    contacting the fluid stream with the structured elements as the fluid stream flows through the structured elements, such that the fluid steam is subdivided into substreams.

2. The method of claim 1, wherein the asperities comprise one or more of channels, flutes, spikes, fibrils and filaments.

3. The method of claim 1, wherein the structured elements comprise a plurality of differently-shaped unit cells.

4. The method of claim 1, wherein the asperities comprise one or more of fibrils and filaments.

* * * * *